United States Patent
Fisher et al.

(10) Patent No.: US 11,348,391 B2
(45) Date of Patent: May 31, 2022

(54) ELECTRONIC LOCKBOX WITH SCHEDULE CONTROLLED ACCESS CREDENTIALS

(71) Applicant: SentriLock, LLC, Cincinnati, OH (US)

(72) Inventors: Scott R. Fisher, West Chester, OH (US); Charles P. Shroder, West Chester, OH (US)

(73) Assignee: Sentri Lock, LLC, Cincinnati, OH (US)

( * ) Notice: Subject to any disclaimer, the term of this patent is extended or adjusted under 35 U.S.C. 154(b) by 46 days.

(21) Appl. No.: 16/925,426

(22) Filed: Jul. 10, 2020

(65) Prior Publication Data
US 2021/0027559 A1 Jan. 28, 2021

Related U.S. Application Data

(60) Provisional application No. 62/878,123, filed on Jul. 24, 2019.

(51) Int. Cl.
*G07C 9/00* (2020.01)
*G06Q 10/02* (2012.01)
*H04W 4/029* (2018.01)

(52) U.S. Cl.
CPC ......... *G07C 9/00571* (2013.01); *G06Q 10/02* (2013.01); *G07C 9/00309* (2013.01); *H04W 4/029* (2018.02); *G07C 2009/00436* (2013.01)

(58) Field of Classification Search
CPC ............ G07C 9/00571; G07C 9/00309; G07C 2009/00436; H04W 4/029; G06Q 10/02
See application file for complete search history.

(56) References Cited

U.S. PATENT DOCUMENTS

| 5,654,696 A | 8/1997 | Barrett |
| 5,705,991 A | 1/1998 | Kniffin |
| 6,989,732 B2 | 1/2006 | Fisher |
| 7,009,489 B2 | 3/2006 | Fisher |

(Continued)

FOREIGN PATENT DOCUMENTS

WO WO 1993/014571 7/1993

OTHER PUBLICATIONS

International Search Report, PCT/US2020/041493, 24 pages (dated Sep. 30, 2020).

*Primary Examiner* — Chico A Foxx
(74) *Attorney, Agent, or Firm* — Frederick H. Gribbell; Russell F. Gribbell

(57) ABSTRACT

An electronic lockbox control system allows visiting agents (such a "showing agents" in a real estate sales situation) to make an appointment to visit a property that is protected by an electronic lockbox, using a time-sensitive authorizing credential that is provided by a central computer; and then, if that visiting agent is delayed because of an earlier appointment, the central computer can automatically create a new time-sensitive authorizing credential that is time-shifted, so that visiting agent can later visit that remote property and obtain access to that lockbox at the later, time-shifted appointment time. Another interested party (e.g., a homeowner) can decline that later, time-shifted appointment. The visiting agent can carry a smart phone with a GPS receiver, and the central computer can use his GPS coordinates to calculate his physical position, and calculate his travel time to the next lockbox location to automatically create the new, time-shifted appointment time.

21 Claims, 12 Drawing Sheets

(56) References Cited

U.S. PATENT DOCUMENTS

| | | | |
|---|---|---|---|
| 7,193,503 B2 | 3/2007 | Fisher | |
| 7,664,801 B2 | 2/2010 | Walker | |
| RE43,068 E | 1/2012 | Woodard | |
| 9,912,659 B1* | 3/2018 | Widdows | H04W 12/068 |
| 10,026,250 B2* | 7/2018 | Fisher | G07C 9/00309 |
| RE47,762 E * | 12/2019 | Thomas | G06Q 50/167 |
| 10,824,996 B1* | 11/2020 | Chu | G06Q 10/1095 |
| 10,885,596 B1* | 1/2021 | Woodard | G06Q 10/1095 |
| 10,891,814 B2* | 1/2021 | Briskey | G07C 9/27 |
| 11,145,016 B1* | 10/2021 | Brophy | G08B 25/001 |
| 2006/0288957 A1 | 12/2006 | Sumner et al. | |
| 2007/0156758 A1 | 7/2007 | Adiga | |
| 2008/0167937 A1 | 7/2008 | Coughlin | |
| 2010/0245107 A1 | 9/2010 | Fulker | |
| 2011/0015963 A1* | 1/2011 | Chafle | G06Q 30/0205 |
| | | | 705/7.16 |
| 2014/0236350 A1* | 8/2014 | Woodard | G06Q 10/1095 |
| | | | 700/237 |
| 2014/0266586 A1* | 9/2014 | Fisher | G06Q 50/16 |
| | | | 340/5.61 |
| 2015/0324710 A1* | 11/2015 | Sasaki | G06Q 10/06311 |
| | | | 705/5 |
| 2016/0253464 A1 | 1/2016 | Balwani et al. | |
| 2016/0180621 A1 | 6/2016 | Desinor | |
| 2016/0364928 A1* | 12/2016 | Woodard | G07C 9/00571 |
| 2017/0103597 A1 | 4/2017 | Fisher | |
| 2018/0061160 A1* | 3/2018 | Woodard | G07F 9/002 |
| 2019/0102746 A1* | 4/2019 | Gupta | G06Q 10/1095 |

\* cited by examiner

ELECTRONIC LOCKBOX WITH SCHEDULE CONTROLLED ACCESS CREDENTIALS

CROSS-REFERENCE TO RELATED APPLICATIONS

The present application claims priority to provisional patent application Ser. No. 62/878,123, titled "ELECTRONIC LOCKBOX WITH SCHEDULE CONTROLLED ACCESS CREDENTIALS," filed on Jul. 24, 2019.

TECHNICAL FIELD

The technology disclosed herein relates generally to electronic locks and electronic lockbox systems and is particularly directed to a system of the type that includes a wireless portable computer (such as a smart phone, or a tablet computer; i.e., electronic products that as a group are sometimes referred to "smart devices") that communicates with an electronic lockbox using a low power radio link. Embodiments are specifically disclosed as using a wireless portable computer (a "WPC") that includes both a low power radio to communicate to the lockbox and a wide area network (WAN) radio to communicate to a central computer, and optionally includes a Global Positioning System (GPS) receiver to, for example, determine approximate physical location of the lockbox when the WPC is in communication with the lockbox. (The central computer in some systems is often referred to as a "central clearinghouse computer" or "CCC".)

An embodiment is disclosed involving the wireless portable computer that communicates to an electronic lockbox using a low power radio and that communicates to a central computer using a wide area network radio. In many of the advanced functions of this technology, the WPC can comprise a smart phone, which can run application software programs (called "APPs"), to customize the functions executed by the smart phone, and to allow certain information (including information residing on the central computer) to be displayed on the smart phone.

Embodiments are also disclosed as an automatic control system having an electronic lockbox (or other type of secure electronic product) that sends identifying data to the WPC via a low power radio, and the WPC relays that data to the central computer. Examples of such data include attempted accesses of the electronic lock system, including successful attempts; the electronic equipment typically keeps an "event log" and an "access log" of such access attempts, successful or otherwise.

Other types of data involving electronic lockboxes typically includes appointment times for "showing" a property to a prospective buyer. In today's real estate sales situation, a "showing agent" will make more than one appointment for a specific date, often to show more than one property that is for sale. (These multiple appointments could all be for a single potential/prospective buyer, or for multiple potential buyers, for example.) But if the showing agent becomes delayed for any reason, his or her subsequent appointment(s) may not be able to take place at the originally-scheduled time. The new technology disclosed herein improves the scheduling component of showings by providing automated communication messages to the interested parties, when such delays occur. Moreover, if one of the interested parties cannot accommodate such a delay in a particular appointment, then that person (or organization) will have the ability to respond with a negative answer, which would effectively cancel one of the later appointments for that showing agent (whose own tardiness was the cause of this delay in the first place).

The technology disclosed herein can be used in many other situations than merely for real estate sales. For example, electronic lockboxes can be used on properties in which a medical care worker is scheduled to visit a patient who is living at a specific property, to give that patient an insulin shot, for example. Or a social worker could be scheduled to visit a person or a family living at a specific property, for example. Such properties could be protected by an electronic lockbox, and the "visiting agent" (e.g., the medical care worker, or the social worker) could have authorizing credentials for obtaining access to a dwelling key that is stored in that electronic lockbox, for example. Furthermore, the types of properties to be visited by an authorized person is not limited to dwellings. Particularly in the case of real estate sales, the property being visited could be a commercial building, a former government building, or even an empty lot.

In many "newer" dwellings or other types of buildings, the access points are securely controlled by some type of electronic lock, rather than by a mechanical lock. Such electronic security products will be generally referred to herein as "EL", which reflects their characteristics as being electronic locks. Such dwellings/buildings may also contain an alarm system in addition to having an electronic lock (an EL). Alternatively, some dwellings/buildings can have a mechanical lock, but still have an alarm system.

In some situations, such as in real estate sales, a real estate sales agent (such as a REALTOR®) will arrive at a dwelling that is for sale and then "show" that dwelling to a potential buyer (which is typically referred to as a "showing"). To conduct that showing, the real estate sales agent obviously needs to obtain access to the interior spaces of that dwelling. In the past, the sales agent (commonly known as the "showing agent") would obtain access to an electronic lockbox that contained a mechanical key to the dwelling door, and then enter that dwelling. However, if the dwelling is protected by an electronic lock, then a mechanical key would not typically be available, and instead, the sales agent would need an appropriate "APP" installed on their WPC and have the correct credentials for the dwelling owner's electronic lock. The inventor of the technology disclosed herein has also disclosed, in another patent application, a system that will automate that rather bulky procedure and provide a seamless interface for both mechanical locks and their keys, plus electronic door locks that are increasingly found on properties.

As noted above, the technology disclosed herein can be used for real estate sales situations, for medical personnel visits, for social worker visits, and for many other types of circumstances, some of which are unforeseen at this time. In view of this reality, the personnel involved in setting up or in operating the system disclosed herein are not always real estate agents, or real estate owners/sellers or real estate potential/prospective buyers; therefore, other terminology may be used at various places in the description provided below.

An enhancement to electronic lockbox systems is described herein, and improves the scheduling component of showings by anticipating delays, by providing automated communications to the interested parties of "expected" deviations, as they arise. Further, the system automates the delivery of time-limited authorization of access to a specific electronic lockbox that is to be utilized in the scheduled showing process. These "time-limited credentials" provide the overall computer system with an improved function for providing the wireless portable computers with proper "schedule controlled access credentials," which will be in effect both for originally-scheduled appointments, and for automatically rescheduled appointments (see below).

It should be noted while this embodiment references the typical activities of real estate agents, the same control system construct can be use in any situation in which an individual has prepared a series of sequential scheduled stops, by which an electronic lockbox is used to gain access to the physical property locations. In such activities, the departure time is compared in near real time with the estimated travel time to the next scheduled appointment. For example, a health care worker providing insulin shots to patients across a geographic area could use this functionality to alert those "down line" in the schedule of a delay that crops up, perhaps shifting meal times or other care workers visits in reaction to the schedule interruptions. Another possible feature is to cause additional care workers to be diverted or dispatched to the location being delayed, to ensure that timely administration of medication is performed.

It is the intent of this new technology to provide automated notifications, an opportunity to coordinate rescheduling, and to deliver updated access credential times to authorized users (as "visiting agents") who have been scheduled to visit specific property locations. In general, the visiting agent will carry a wireless portable computer (or "WPC"), such as a smart phone or a tablet computer. Many of the features described herein are based on communicating with such wireless portable computers, and knowing (at a particular time) the location of a particular wireless portable computer and, by inference, the location of the pertinent visiting agent.

Note that, in real estate settings, there usually are four interested parties involved in a single transaction: (1) a "seller" who owns or manages the property for sale, or for lease; (2) a prospective "buyer" who desires to visit that property to see it in person (or to see it over a network of computers, such as the Internet); (3) a "listing agent" who typically owns the lockbox that is placed on the property for sale (or lease), in which the lockbox contains a key to that property within its secure compartment; and (4) a "showing agent" who conducts a "showing" of that property so the prospective buyer can see inside the building, or visit a fenced-in property.

It should be noted that the showing agent is also a "visiting agent," which is a broader term that includes medical personnel (a "medical care worker") who may visit a patient at home, for example, or a social worker, as noted above. The listing agent is also the person who "lists" the property as being available for sale with the agent's local Real Estate Board. In non-real estate sales situations, the "listing agent" would typically be a manager who "sets up" the properties that are to be visited by medical care workers or social workers, for example. That property manager would also be responsible for physically installing the lockboxes that are involved in protecting the properties that are going to be visited by those medical care workers or social workers, who will become authorized to obtain access to the dwelling key inside the secure compartment of those lockboxes.

In many cases, those lockboxes will be mounted to a wall bracket on, or near, the building (e.g., a dwelling) that is to be visited. Finally: the scheduling, and automatic rescheduling features described herein can be used both in real estate sales situations, and in other situations where the visit to the property is supposed to be scheduled in advance, using those features described herein. Note that fire department officials or other types of first responders may also become "visiting agents" as discussed herein; of course, such first responders would not always be making scheduled-in-advance appointments, but there are situations where that may be likely, such as for building inspections, or for periodic fire pump tests for larger (and taller) buildings.

STATEMENT REGARDING FEDERALLY SPONSORED RESEARCH OR DEVELOPMENT

None.

BACKGROUND

In electronic lockbox systems used in the field of real estate sales, there exists the need to better control access to the home for the sake of home sellers. Most often home sellers leave the home during the property "showing" to allow the buyer to feel less intimated. Many times, real estate agents representing buyers will schedule consecutive showings to make more efficient use of the buyers' time, as well as to optimize the search process. The current coordination of showing schedules is cumbersome, and does not anticipate events in which showings are missed due to unforeseen desire for a potential buyer to spend more than the originally-scheduled time at one listing, thereby impacting the future scheduled showing appointments.

SUMMARY

Accordingly, it is an advantage to provide an electronic lockbox control system that allows visiting agents (such a "showing agents" in a real estate sales situation) to make an appointment to visit a remote property that is protected by an electronic lockbox, using a time-sensitive authorizing credential that is provided by a central computer; and then, if that visiting agent is delayed because of an earlier appointment, the central computer can automatically create a new time-sensitive authorizing credential that is time-shifted to account for that time delay, so that same visiting agent can later visit that remote property and obtain access to that lockbox at the later, time-shifted appointment time.

It is another advantage to provide an electronic lockbox control system that allows visiting agents to make an appointment to visit a remote property that is protected by an electronic lockbox, using a time-sensitive authorizing credential that is provided by a central computer; and then, if that visiting agent is delayed because of an earlier appointment, the central computer can automatically create a new time-sensitive authorizing credential that is time-shifted to account for that time delay; however, another interested party (such as a real estate "listing agent," or a homeowner) has the ability to decline that later, time-shifted appointment and that visiting agent will not be authorized to obtain access to that lockbox at the later, time-shifted appointment time.

It is yet another advantage to provide an electronic lockbox control system that allows visiting agents to make an appointment to visit a remote property that is protected by an electronic lockbox, using a time-sensitive authorizing credential that is provided by a central computer; and then, if that visiting agent is delayed because of an earlier appointment, the central computer can automatically create a new time-sensitive authorizing credential that is time-shifted to account for that time delay, so that same visiting agent can later visit that remote property and obtain access to that lockbox at the later, time-shifted appointment time. The visiting agent can carry a smart phone with a GPS receiver, and the central computer can use his GPS coordinates to calculate his physical position, and with that information, can calculate his travel time to the next lockbox location to automatically create the new, time-shifted appointment time.

It is still another advantage to provide an electronic lockbox control system that allows visiting agents (such a "health care worker" who travels to various dwellings to administer insulin shots to shut-in persons, for example) to make an appointment to visit a remote property that is protected by an electronic lockbox, using a time-sensitive authorizing credential that is provided by a central computer; and then, if that visiting agent is delayed because of an earlier appointment, the central computer can automatically create a new time-sensitive authorizing credential that is time-shifted to account for that time delay, so that same visiting agent can later visit that remote property and obtain access to that lockbox at the later, time-shifted appointment time.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an electronic lockbox control system is provided, which comprises: a plurality of electronic lockboxes, at least one wireless portable computer, a central computer, and a communications network that allows data messages to be sent between the central computer and the at least one wireless portable computer; the central computer includes a first processing circuit, a first memory circuit, a first communications circuit, and a database that contains a plurality of appointment schedule events; a first of the at least one wireless portable computer includes a second processing circuit, a second memory circuit, a first display, a first user-activated data input circuit, and a second wireless communications circuit, wherein the second wireless communications circuit can exchange data messages with the central computer, and with other wireless computers; and each of the plurality of electronic lockboxes including a third processing circuit, a third memory circuit, a third wireless communications circuit, and a secure compartment that is controlled by the third processing circuit, wherein the third wireless communications circuit can exchange data messages with the first wireless portable computer; wherein: the central computer automatically sends data messages to the first wireless portable computer, in which the data messages include time limited access credentials that are responsive to appointment schedule events pertaining to at least one of the plurality of electronic lockboxes.

In accordance with another aspect, an electronic lockbox control system is provided, which comprises: a plurality of electronic lockboxes, at least one wireless portable computer, a central computer, and a communications network that allows data messages to be sent between the central computer and the at least one wireless portable computer; the central computer includes a first processing circuit, a first memory circuit, a first communications circuit, and a database that contains a plurality of appointment schedule events; a first of the at least one wireless portable computer includes a second processing circuit, a second memory circuit, a first display, a first user-activated data input circuit, a global positioning (GPS) receiver, and a second wireless communications circuit, wherein the second wireless communications circuit can exchange data messages with the central computer, and with other wireless computers; and each of the plurality of electronic lockboxes including a third processing circuit, a third memory circuit, a third wireless communications circuit, and a secure compartment that is controlled by the third processing circuit, wherein the third wireless communications circuit can exchange data messages with the at least one wireless portable computer; wherein: the central computer is in periodic communication with the first wireless portable computer; the central computer automatically determines the approximate geographic location of the first wireless portable computer, using data from the GPS receiver, and compares the next scheduled location visit time for the person using that first wireless portable computer with the travel time from the current location to the next scheduled location; and if, due to the necessary travel time, the next scheduled visit cannot occur on time, the central computer sends a data message to at least one other system user, the data message including a revised estimated schedule visit time.

In accordance with yet another aspect, an electronic lockbox control system is provided, which comprises: a plurality of electronic lockboxes, at least one wireless portable computer, a central computer, and a communications network that allows data messages to be sent between the central computer and the at least one wireless portable computer; the central computer includes a first processing circuit, a first memory circuit including instructions executable by the first processing circuit, a first communications circuit, and a database that contains a plurality of appointment schedule events; a first of the at least one wireless portable computer includes a second processing circuit, a second memory circuit including instructions executable by the second processing circuit, a first display, a first user-activated data input circuit, and a second wireless communications circuit, wherein the second wireless communications circuit can exchange data messages with the central computer, and with other wireless computers; and each of the plurality of electronic lockboxes including a third processing circuit, a third memory circuit including instructions executable by the third processing circuit, a third wireless communications circuit, and a secure compartment that is controlled by the third processing circuit, wherein the third wireless communications circuit can exchange data messages with the first wireless portable computer; wherein: (a) the central computer automatically sends data messages to the first wireless portable computer, using the communications network, in which the data messages include time limited access credentials that are responsive to appointment schedule events pertaining both to at least one of the plurality of electronic lockboxes and to the first wireless portable computer; (b) based upon physical location information of the first wireless portable computer at a particular time, if the central computer determines that a particular appointment schedule event will not successfully occur within a first predetermined appointment time interval with regard to a first one of the plurality of electronic lockboxes and the first wireless portable computer; then (c) the central computer automatically reschedules the first predetermined appointment time interval to a second predetermined appointment time interval that is time-shifted with respect to the first predetermined appointment time interval, with regard to the first one of the plurality of electronic lockboxes and the first wireless portable computer.

In accordance with still another aspect, an electronic lockbox control system is provided, which comprises: a plurality of electronic lockboxes, at least one wireless portable computer, a central computer, and a communications network that allows data messages to be sent between the central computer and the at least one wireless portable computer; the central computer includes a first processing circuit, a first memory circuit including instructions executable by the first processing circuit, a first communications circuit, and a database that contains a plurality of appointment schedule events; a first of the at least one wireless portable computer includes a second processing circuit, a second memory circuit including instructions executable by the second processing circuit, a first display, a first user-activated data input circuit, a global positioning system (GPS) receiver, and a second wireless communications circuit, wherein the second wireless communications circuit can exchange data messages with the central computer, and with other wireless computers; and each of the plurality of electronic lockboxes including a third processing circuit, a third memory circuit including instructions executable by the third processing circuit, a third wireless communications circuit, and a secure compartment that is controlled by the third processing circuit, wherein the third wireless communications circuit can exchange data messages with the at least one wireless portable computer; wherein: the central computer is in periodic communication with the first wireless portable computer; the central computer automatically determines the approximate geographic location of the first wireless portable computer, using data from the GPS receiver, and compares the next scheduled location visit time for the person using that first wireless portable computer with the travel time from the current location to the next scheduled location; and if, due to the necessary travel time, the next scheduled visit cannot occur on time, the central computer sends a data message to at least one other system user, the data message including a revised estimated schedule visit time.

In accordance with a further aspect, an electronic lockbox control system is provided, which comprises: a plurality of electronic lockboxes, at least one wireless portable computer, a central computer, and a communications network that allows data messages to be sent between the central computer and the at least one wireless portable computer; the central computer includes a first processing circuit, a first memory circuit including instructions executable by the first processing circuit, a first communications circuit, and a database that contains a plurality of appointment schedule events; a first of the at least one wireless portable computer includes a second processing circuit, a second memory circuit including instructions executable by the second processing circuit, a first display, a first user-activated data input circuit, and a second wireless communications circuit, wherein the second wireless communications circuit can exchange data messages with the central computer, and with other wireless computers; and each of the plurality of electronic lockboxes including a third processing circuit, a third memory circuit including instructions executable by the third processing circuit, a third wireless communications circuit, and a secure compartment that is controlled by the third processing circuit, wherein the third wireless communications circuit can exchange data messages with the first wireless portable computer; wherein: (a) the central computer sends data messages to the first wireless portable computer, using the communications network, in which the data messages include time limited access credentials that are responsive to appointment schedule events pertaining both to at least one of the plurality of electronic lockboxes and to the first wireless portable computer; (b) based upon physical location information of the first wireless portable computer at a particular time, if the central computer determines that a particular future appointment schedule event will not successfully occur within a first predetermined appointment time interval, including an evaluation of expected travel time, with regard to a first one of the plurality of electronic lockboxes and the first wireless portable computer; then (c) the central computer reschedules the first predetermined appointment time interval to a second predetermined appointment time interval that is time-shifted with respect to the first predetermined appointment time interval, with regard to the first one of the plurality of electronic lockboxes and the first wireless portable computer; (d) the central computer sends another one of the data messages to the first wireless portable computer which contains information about the second predetermined appointment time interval; and (e) if the first wireless portable computer is presented to the first one of the plurality of electronic lockboxes at a time that is outside of the second predetermined appointment time interval, within a predetermined time tolerance, then the first wireless portable computer will be denied access to the first one of the plurality of electronic lockboxes.

In accordance with a yet further aspect, an electronic lockbox control system is provided, which comprises: a plurality of electronic lockboxes, at least one wireless portable computer, a central computer, and a communications network that allows data messages to be sent between the central computer and the at least one wireless portable computer; the central computer includes a first processing circuit, a first memory circuit including instructions executable by the first processing circuit, a first communications circuit, and a database that contains a plurality of appointment schedule events; a first of the at least one wireless portable computer includes a second processing circuit, a second memory circuit including instructions executable by the second processing circuit, a first display, a first user-activated data input circuit, and a second wireless communications circuit, wherein the second wireless communications circuit can exchange data messages with the central computer, and with other wireless computers; and each of the plurality of electronic lockboxes including a third processing circuit, a third memory circuit including instructions executable by the third processing circuit, a third wireless communications circuit, and a secure compartment that is controlled by the third processing circuit, wherein the third wireless communications circuit can exchange data messages with the first wireless portable computer; wherein: (a) the central computer sends at least one data message to the first wireless portable computer, using the communications network, in which the at least one data message includes time limited access credentials that are responsive to appointment schedule events pertaining both to at least one of the plurality of electronic lockboxes and to the first wireless portable computer; (b) based upon physical location information of the first wireless portable computer at a particular time, if the central computer determines that at least one future appointment schedule event will result in a mismatch of physical presence of the first wireless portable computer and the first electronic lockbox with respect to a first predetermined appointment time interval; then (c) the central computer recalculates the first predetermined appointment time interval and determines a second predetermined appointment time interval that is time-shifted with respect to the first predetermined appointment time interval, with regard to the first one of the plurality of electronic lockboxes and the first wireless portable computer; (d) the central computer sends, using the communications network, at least one data message to the first wireless portable computer which contains information about the second predetermined appointment time interval and contains new time limited access credentials that match the second predetermined appointment time interval; and (e) if the first wireless portable computer is presented to the first one of the plurality of electronic lockboxes at a time that is outside of the second predetermined appointment time interval, within a predetermined time tolerance, then the first wireless portable computer will be denied access to the first one of the plurality of electronic lockboxes.

In accordance with a still further aspect, an electronic lockbox control system is provided, which comprises: a plurality of electronic lockboxes, at least one wireless portable computer, a central computer, and a communications network that allows data messages to be sent between the central computer and the at least one wireless portable computer; the central computer includes a first processing circuit, a first memory circuit including instructions executable by the first processing circuit, a first communications circuit, and a database that contains a plurality of appointment schedule events; a first of the at least one wireless portable computer includes a second processing circuit, a second memory circuit including instructions executable by the second processing circuit, a first display, a first user-activated data input circuit, and a second wireless communications circuit, wherein the second wireless communications circuit can exchange data messages with the central computer, and with other wireless computers; and each of the plurality of electronic lockboxes including a third processing circuit, a third memory circuit including instructions executable by the third processing circuit, a third wireless communications circuit, and a secure compartment that is controlled by the third processing circuit, wherein the third wireless communications circuit can exchange data messages with the first wireless portable computer; wherein: (a) the central computer sends data messages to the first wireless portable computer, using the communications network, in which the data messages include time limited access credentials that are responsive to appointment schedule events pertaining both to at least one of the plurality of electronic lockboxes and to the first wireless portable computer; (b) if the central computer receives a request from the first wireless portable computer to move a second appointment schedule event involving a second one of the plurality of electronic lockboxes to an earlier time, while altering a first appointment schedule event involving a first one of the plurality of electronic lockboxes; then (c) the central computer reschedules the second predetermined appointment time interval to a third predetermined appointment time interval that is time-shifted with respect to the second predetermined appointment time interval, with regard to the second one of the plurality of electronic lockboxes and the first wireless portable computer; (d) the central computer sends another one of the data messages to the first wireless portable computer which contains information about the third predetermined appointment time interval; and (e) if the first wireless portable computer is presented to the first one of the plurality of electronic lockboxes at a time that is outside of the third predetermined appointment time interval, within a predetermined time tolerance, then the first wireless portable computer will be denied access to the first one of the plurality of electronic lockboxes.

In accordance with another aspect, an electronic lockbox control system is provided, which comprises: a plurality of electronic lockboxes, at least one wireless portable computer, a central computer, and a communications network that allows data messages to be sent between the central computer and the at least one wireless portable computer; the central computer includes a first processing circuit, a first memory circuit including instructions executable by the first processing circuit, a first communications circuit, and a database that contains a plurality of appointment schedule events; a first of the at least one wireless portable computer includes a second processing circuit, a second memory circuit including instructions executable by the second processing circuit, a first display, a first user-activated data input circuit, a global positioning system (GPS) receiver, a second wireless communications circuit, and a fourth wireless communications circuit, wherein the second wireless communications circuit can exchange data messages with the central computer, and with other wireless computers; and each of the plurality of electronic lockboxes including a third processing circuit, a third memory circuit including instructions executable by the third processing circuit, a third wireless communications circuit, and a secure compartment that is controlled by the third processing circuit, wherein the third wireless communications circuit can exchange data messages with the fourth wireless communications circuit of the at least one wireless portable computer; wherein: the central computer is in periodic communication with the first wireless portable computer; the central computer automatically determines an approximate geographic location of the first wireless portable computer, using data from the GPS receiver, and compares the next scheduled location visit time for a person using the first wireless portable computer with the travel time from the current location to the next scheduled location; and if the next scheduled visit cannot occur on time, including an evaluation of expected travel time, the central computer sends a data message to at least the person using the first wireless portable computer, the data message including a revised estimated schedule visit time.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
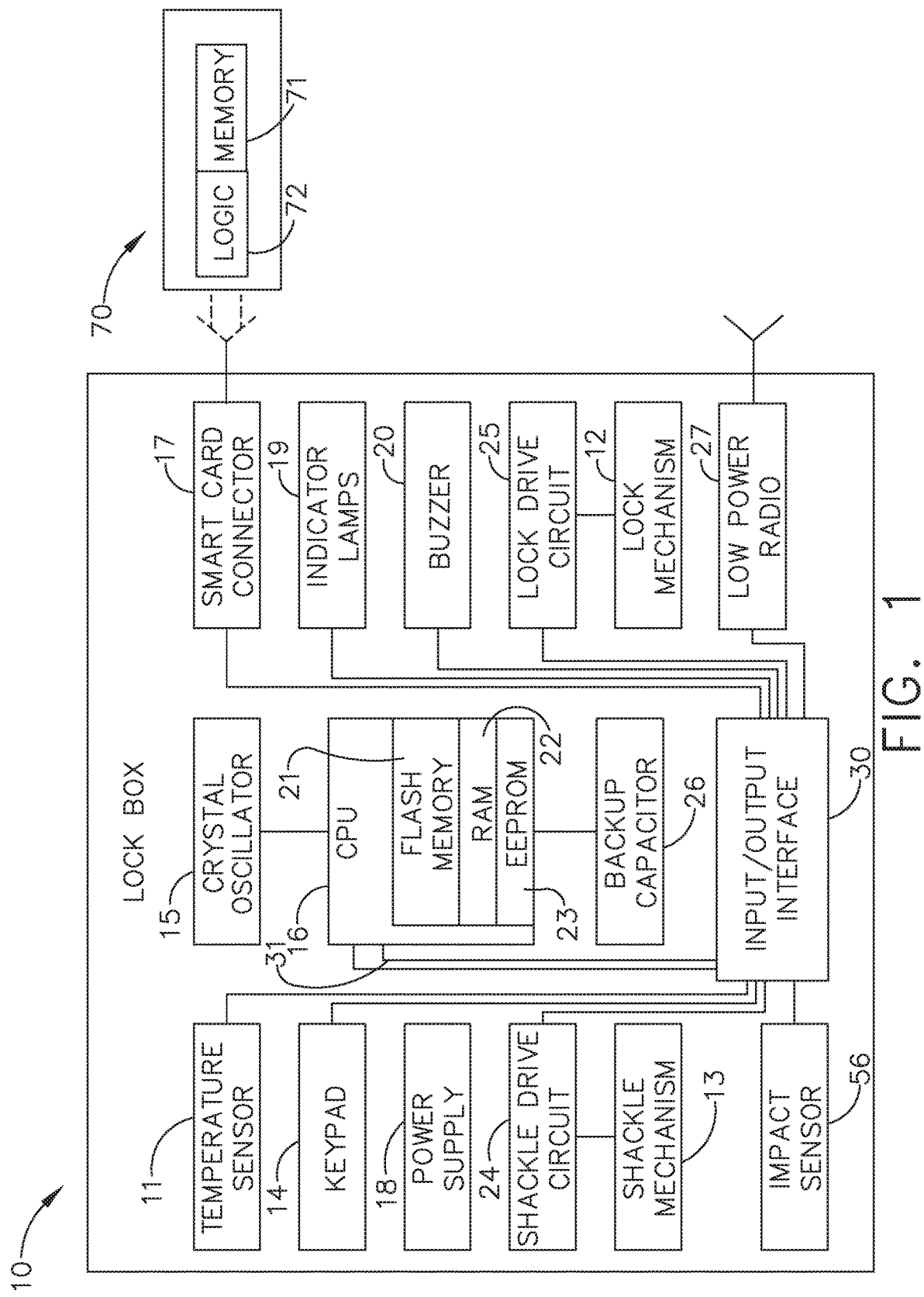
FIG. 1 is a schematic block diagram of the major electrical components of an electronic lockbox, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

INTRODUCTION

As noted above, the technical field of electronic lockboxes is often used in real estate sales transactions, and the technology disclosed herein is certainly applicable there, but it also can be applicable for other types of visiting personnel for other purposes. In virtually every instance, there will be a certain minimum of (human or organizational) players involved: (a) the owner, or the occupant, of the property; (b) an agent who represents the property owner/occupant—this person (or organization) will often be referred to herein as the "owning agent"; (c) an authorized person that will visit the property, according to a previously-scheduled appointment time and date—this person will often be referred to herein as the "visiting agent" or an "authorized visiting person"; and (d) a potential buyer of that property—this, of course, would probably be limited to some type of real estate sales or renting transaction. There may also be other "sub-players" involved in the background, such as medical doctors, or family members of an occupant of a property, and these sub-players may well be involved in making, or cancelling, a scheduled appointment.

For pure real estate sales transactions, the "owning agent" is also referred to as the "listing agent," and the "visiting agent" is also referred to as the "showing agent." The listing agent quite often literally owns the electronic lockbox that is installed at a given property that is listed for sale. The showing agent is the person who becomes an authorized agent and, as such, has the ability to access the dwelling key inside the electronic lockbox—in other words, he or she can "open" the lockbox. The showing agent is usually representing a prospective buyer of the property being visited, and that potential buyer cannot get into the property without the showing agent. However, the potential buyer may have access to certain information that is then made available to that buyer by communicating with that electronic lockbox, during the showing visit.

Setup of Main System

Each user in the lockbox control system installs application software (known as an "APP") on their wireless portable computer (e.g., a wireless portable computer, electronic key, or a smart phone that may include a GPS receiver, or other type of mobile device) that communicates with the central clearinghouse computer (CCC) over the wide area network (WAN). The application (APP) identifies itself to the CCC via user login credentials and can remain active on the user's portable communication circuit to receive notifications and data from the CCC in near real time (assuming the portable device is in communication range with a cellular tower, or other type of communications node).

In one embodiment, the application on the portable communication device relies on GPS information to determine when it is appropriate to send data to the user's device based on the activity of the user's agent or representative. Most real estate agents have multiple clients, and therefore the CCC must be able to track which client the agent is working with at the time to send the proper data to various users of the system. In the case of seller's agents being matched with sellers, the system utilizes the location of the lockbox, whether pre-assigned by the seller's agent in the CCC database or by GPS information collected through accesses of one or more buyer's agents. For buyer's agents, the CCC identifies both the buyer's agent and the prospective buyer by matching their respective GPS locations and times corresponding to access events at the lockbox. That is, the buyer would obviously be present at the physical location with the buyer's agent during the process of a home showing; therefore, both would have GPS locations that are proximally close to one another.

The method of relationship identification discussed above requires little if any user intervention. It should be noted that one or more buyers or sellers can be automatically associated with their respective representative, e.g., a husband and wife desiring data notifications responsive to events at the lockbox. Once the relationship is determined by the CCC, future data can be pushed to multiple portable communication devices even if only one participant is present at the showing.

Central Computer

Terminology herein relating to the central computer (CCC) should be understood to encompass one or more physical computers, either together at a single location, or computers that are geographically diverse but that work in concert with one another, to store, retrieve, and otherwise process information relevant to operation of the "system." In today's computing parlance, "the cloud" is one possible representation of a computing platform equivalent to that carried out by the CCC in this disclosure. In the real estate sales technical field, the CCC is sometimes referred to herein as a "central computer" or a "clearinghouse computer." In the system described herein, the CCC acts as a control system over certain activities involving electronic lockboxes and "visiting agents."

The CCC will include memory storage products that can hold one or more databases of information; usually one of the databases is updated with new information almost every time a sales agent or a sales prospect communicates with the CCC, under the control of the operating software of the CCC itself. In some applications, as described below, a new database is "started" in the memory of the CCC by certain types of communications and transactions that are initiated by a sales agent or prospect. In many descriptions of this type of equipment, the "database" of the CCC actually represents multiple individual database structures, when viewed from a computer science standpoint—and these are often "relational databases" at that. However, the existence of several database structures is still referred to as a singular tense "database" at times, even though it is understood that a single huge database really comprises more than one type of store of information at the CCC.

Electronic Lockboxes

Referring now to the drawings, FIG. 1 illustrates an exemplary embodiment of an electronic lockbox generally designated by the reference numeral 10, which is suitable for use with the technology disclosed herein. Lockbox 10 has an outer housing, which includes a keypad 14 (see FIG. 2), and the housing includes a movable key compartment door 32 (see FIG. 2). The upper housing of lockbox 10 includes two receptacles (not shown) that receive a shackle 40 (see FIG. 2). The shackle 40 has an upper portion 46, and two shackle extensions (not visible in FIG. 2) that fit through the receptacles. It should be noted that the keypad 14 may also be referred to as a "data input circuit," in which a human user may press one or more of the keys to enter data, such as numeric information.

The electronic circuitry of electronic lockbox 10 is illustrated in block diagram form in FIG. 1. In this illustrated embodiment, electronic lockbox 10 includes a microprocessor (CPU) 16, FLASH memory 21, random access memory (RAM) 22, EEPROM (electrically erasable programmable read only memory) 23, a battery (or other electrical power supply) 18, a memory backup capacitor 26, an ISO-7816 smart card connector 17, indicator LED lamps 19, a piezo buzzer 20, a crystal oscillator 15, a digital temperature sensor 11 (these last two devices can be combined into a single chip), a shackle drive circuit 24, a shackle release mechanism 13, a key compartment mechanism drive circuit 25, a key compartment lock/release mechanism 12, and a membrane style keypad 14 for user data entry. An impact sensor 56 can also be included in electronic lockbox 10, to detect abnormal mechanical forces that might be applied to the device.

An input/output (I/O) interface circuit 30 is included to provide signal conditioning as needed between the CPU 16 and other components that typically use voltage and/or current levels that are not typically able to hook up directly to a processing device, such as sensors and output device driver circuits. Each appropriate I/O signal is directed through a separate channel of the I/O interface circuit 30, unless perhaps more than one signal of a particular voltage and current rating can be multiplexed, in which case a multiplexer circuit can be included in the I/O interface circuit 30. The data signals between I/O circuit 30 and the CPU 16 run through a low voltage signal bus 31.

A data interface in the form of a low power radio 27 is included in this embodiment so that the CPU 16 is able to communicate with other external devices, such as a separate wireless portable computer 100 (see FIG. 2) that uses a compatible wireless data link. (The wireless portable computer can also be referred to as a "mobile device," a "WPC", an "electronic key," or a "smart phone" in some embodiments of this technology.) The wireless portable computer 100 also includes a low power radio 127, which communicates with radio 27 using a protocol that could be proprietary, if desired. However, the radios 27 and 127 could use any number of various communications protocols, such as Bluetooth, although the data structure in the messages between radios 27 and 127 certainly could be encrypted, or otherwise formatted in a proprietary manner Radios 27 and 127 further could comprise other types of wireless communications devices that may not operate on a strictly radio principle, including types of wireless communications devices that have not been invented as of yet. In this description, such wireless communications devices will typically be referred to as "radios;" however, in this patent document they may also be referred to as a "short range wireless communications device," or a "low power wireless communications device."

Microprocessor 16 controls the operation of the electronic lockbox 10 according to programmed instructions (electronic lockbox control software) stored in a memory circuit, such as in FLASH memory 21. RAM memory 22 is typically used to store various data elements such as counters, software variables and other informational data. EEPROM memory 23 is typically used to store more permanent electronic lockbox data such as serial number, configuration information, and other important data. It will be understood that many different types of microprocessors or microcontrollers could be used in the electronic lockbox system 10, and that many different types of memory circuits could be used to store data in both volatile and non-volatile form, without departing from the principles disclosed herein. In one mode of an exemplary embodiment, the electronic lockbox CPU 16 is an 8-bit Atmel Mega8 microcontroller that incorporates RAM 22, FLASH memory 21 and EEPROM memory 23 internally (as on-board memory).

Battery 18 provides the operating electrical power for the electronic lockbox. Capacitor 26 is used to provide temporary memory retention power during replacement of battery 18. It will be understood that an alternative electrical power supply could be used if desired, such as a solar panel with the memory backup capacitor.

As noted above, electronic lockbox 10 includes a shackle 40 that is typically used to attach the box 10 to a door handle or other fixed object. Electronic lockbox 10 also includes a key compartment which typically holds a dwelling key (not shown), and which can be accessed via the key access door 32 (which is also referred to herein as a "controlled access member").

The key compartment lock and release mechanism 12 uses a gear motor mechanism (not shown) that is controlled by drive circuit 25 that in turn is controlled by CPU 16. Shackle release mechanism 13 also uses a gear motor, which is controlled by drive circuit 24 that in turn is controlled by CPU 16. It will be understood that the release or locking mechanisms used for the shackle 40 and key compartment 32 can be constructed of many different types of mechanical or electromechanical devices without departing from the principles disclosed herein.

The crystal oscillator 15 provides a steady or near-constant frequency (e.g., at 32.768 kHz) clock signal to CPU 16's asynchronous timer logic circuit. The ISO-7816 smart card connector 17 connects to electrical contacts on a "smart card" 70 to allow the exchange of data between the electronic lockbox's CPU 26 and memory devices 71 in the smart card 70 (discussed below in greater detail). The smart card 70 itself typically will include some control logic circuits 72, to prevent "easy" or unauthorized access to the memory elements 71 on-board the card 70. Note that such a smart card is not required in some more advanced versions of electronic lockboxes.

It should be noted that an electronic key (such as that described above) could be used as a type of secure memory device for the element at reference numeral 70, rather than a classic "smart card." Such an electronic key would also contain memory elements 71, and perhaps would contain some control logic circuits 72, although the control logic circuits might be optional, depending on the type of electronic key device that is used. With regard to FIG. 1, if an electronic key is used, it could be interfaced to the CPU circuit 16 of the electronic lockbox 10 is many different ways, including via an electrical circuit that makes contact between the lockbox 10 and the electronic key 70 (similar to that depicted on FIG. 1), or perhaps via an electromagnetic signal such as a short range radio wave, or an optical signal. As used herein, the term "electronic key" can have a meaning to include a relatively simple device, such as a secure memory card (or a "smart card"), and it can have a meaning to include a sophisticated device, such as a laptop computer or a smart phone that has a wireless communications circuit to send and receive messages from other devices, including an electronic lockbox and/or a central computer. A "typical" electronic key will generally be a more sophisticated device.

In one embodiment, the digital temperature sensor 11 is read at regular intervals by the electronic lockbox CPU 16 to determine the ambient temperature. Crystal oscillator 15 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal 15 and thus compensating for the drift and allowing precise timing measurement regardless of electronic lockbox operating environment temperature. As noted above, a single chip can be used to replace the combination of crystal oscillator 15 and temperature sensor 11, such as a part number DS32KHZ manufactured by Dallas Semiconductor.

In another embodiment, the crystal oscillator can be replaced with a MEMS based resonator with built in temperature compensation to maintain a highly accurate clock signal. One such component is the SiTime SiT1532.

The LED indicator lamps 19 and piezo buzzer 20 are included to provide both an audible and a visual feedback of operational status of the electronic lockbox 10. Their specific uses are described in detail in other patent documents by the same inventor, as noted below.

The impact sensor 56 can be used to notify an external device, in case of an attempted removal or other type of damage being done to the lockbox 10, including intentional damage. Such an external device could comprise a "base station" as described in detail in other patent documents by the same inventor, or it could comprise the wireless portable computer 100 that is described herein.

Backup capacitor 26 is charged by battery 18 (or perhaps by another power source) during normal operation. Capacitor 26 serves two functions, the first of which is to maintain adequate voltage to CPU 16 during either shackle drive circuit activation, or lock drive circuit activation. In an exemplary embodiment, capacitor 26 is charged from the regulated side of voltage regulator in power supply 18, whereas all electromechanical drive current is derived from the unregulated side of power supply 18. Capacitor 26 also maintains a stable voltage to CPU 16 during periods of high current drain on power supply 18. The second function of capacitor 26 is to maintain CPU 16 operation and RAM memory 22 during a period when the battery 18 is replaced.

Figure 2:
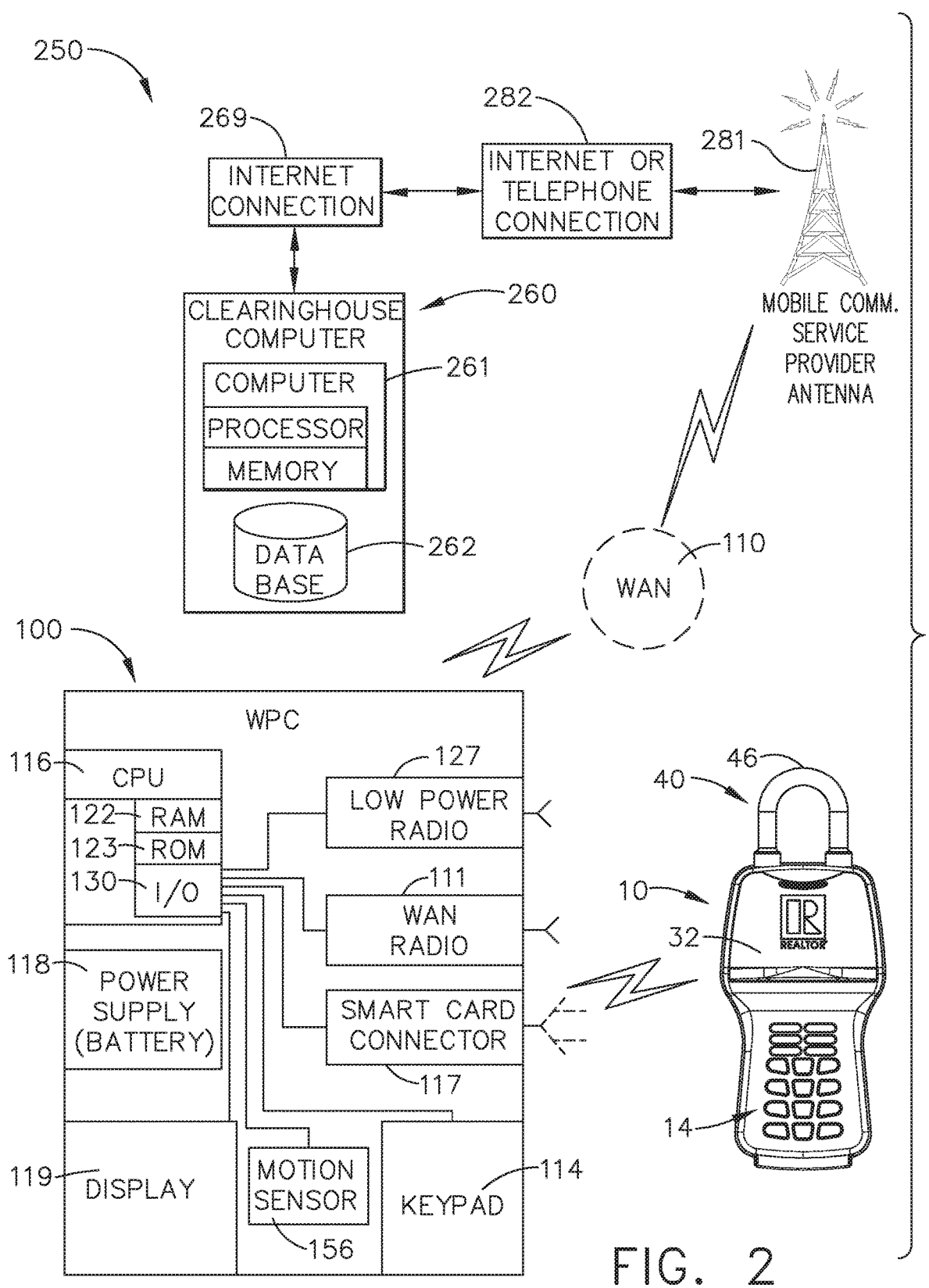
FIG. 2 is a diagrammatic view of the major components of a first embodiment of an electronic lockbox security system, including a central computer station, a wireless portable computer, and a portable electronic lockbox apparatus such as that depicted in FIG. 1.

Referring now to FIG. 2, a first embodiment electronic lockbox system, generally designated by the reference numeral 250, is depicted. The system 250 includes one or more electronic lockboxes 10, perhaps one or more secure memory cards (not shown on FIG. 2), wireless portable computer devices 100, a central computer system 260 (also sometimes referred to herein as a "CCC"), and a wireless data communications system, represented by Internet® connections 269 and 282, and a mobile phone provider 281. The central computer 260 typically will include a database 262 which contains a repository of electronic lockbox identification and attribute information, and also contains a repository of information about real estate agents. A computer 261 controls the database 262, and includes a processing circuit and a memory circuit (in addition to any bulk memory storage devices that contain the database 262).

Referring again to FIG. 2, an electronic lockbox system of a first embodiment is depicted in a diagrammatic view. An electronic lockbox 10 is depicted in the lower-right corner of FIG. 2, and is shown communicating to a wireless portable computer 100. As discussed above, wireless portable computer 100 includes a low power radio 127 that can communicate data to and from the low power radio 27 of the electronic lockbox 10. Some of the other components of the wireless portable computer 100 are depicted on FIG. 2.

In this embodiment, wireless portable computer 100 includes a microprocessor (CPU) 116, random access memory (RAM) 122, read only memory (ROM) 123, and an input/output interface circuit 130. There are several devices that are in communication with the input/output (I/O) circuit 130, as discussed immediately below.

The low power radio 127 communicates data to and from the CPU 116, via the I/O circuit 130. A wide area network (WAN) radio 111 is provided, and it also communicates data to and from the CPU 116, via the I/O interface circuit 130. Wireless portable computer 100 also may include an optional smart card connector 117, which is essentially identical to the smart card connector 17 that is provided on the electronic lockbox 10. Wireless portable computer 100 also includes a display 119, a keypad 114, a power supply 118 (typically a battery), and a motion sensor 156. The motion sensor 156 provides additional capability for the wireless portable computer 100, as discussed in greater detail below.

Because of its wide area network radio 111, wireless portable computer 100 is able to communicate to the clearinghouse computer 260 over a wide area network (WAN), which is generally designated by the reference numeral 110. Assuming that the mobile communications service provider 281 is a cellular telephone system, the wireless portable computer 100 will have the capability of essentially immediate communications with the clearinghouse computer 260 from many, many locations, including most locations where an electronic lockbox 10 has been situated. On the other hand, if a particular electronic lockbox 10 is located in a very remote area, where there is no cellular telephone connection coverage, then the wide area network 110 therefore would not reach that location, and the wireless portable computer 100 would not be in immediate communication with the clearinghouse computer 260.

The wide area network radio 111 further could comprise other types of wireless communications devices that may not operate on a strictly radio principle, including types of wireless communications devices that have not been invented as of yet. In this description, such wireless communications devices are sometimes referred to as "radios;" however, in this patent document they may also be referred to as a "wide area network wireless communications circuit," or as a "medium range wireless communications circuit."

In a preferred mode of the first embodiment depicted on FIG. 2, the wireless portable computer 100 includes a connector 117 that is capable of accepting a secure memory card (such as a "smart card"), so that a user who typically connects his or her secure memory card directly to an electronic lockbox 10 will also be able to connect the same secure memory card to the wireless portable computer 100, and have much the same results. This will be described in greater detail below. Note that the smart card connector can also be referred to as a "data interface" that communicates with a "secure memory device"—a "smart card" is an example of a secure memory device.

The first radio circuit of the wireless portable computer is the low power radio 127 such as Atmel's AT86RF23x series that uses a low power radio frequency signal. The wireless portable computer also includes a second radio circuit which is capable of longer range communications for wide area network connectivity, such as Wavecom's WISMO22x series. In a preferred embodiment, the CPU 116 will comprise a low power microcontroller, and a relatively low power visual display 119 will be provided to allow indication of operating status. The motion sensor 156 is to be included as an internal motion sensor that is coupled to the microcontroller (CPU 116). Its capability and use are described below.

The low power communications circuit in the lockbox (e.g. low power radio 27) provides sufficient range to enable proximal communications with a wireless portable computer 100 that is carried by the lockbox system user. The built-in wide area communication radio of the transponder (e.g., WAN radio 111), such as radios used by a cellular carrier, enables a host of other system features. One desirable feature of this arrangement is for individuals who access an electronic lockbox to be unencumbered with other devices. For example, real estate agents often have their hands full when approaching a lockbox, and such an agent that is equipped with a wireless portable computer 100 can enter a personal identification code on the keypad 114 of the wireless portable computer 100. It should be noted that the keypad 114 may also be referred to as a "data input circuit," in which a user (e.g., a sales "agent") may press one or more of the keys to enter data, such as numeric information.

Such an agent could initially use the wireless portable computer and its keypad while remaining in a vehicle, for example, and inserting their secure memory card into the connector 117 of the wireless portable computer 100. In this mode, the agent can prepare his or her wireless portable computer to be ready to communicate his or her personal identification code from the transponder 100 to the lockbox 10 over the low power radio link (between radios 127 and 27), and the electronic lockbox will interpret that radio signal to allow access to the key compartment door 32. In this manner, the lockbox radio system retrieves data from the wireless portable computer 100 to facilitate access to the dwelling key that is contained within the secure compartment of the electronic lockbox 10.

In another operating mode, a secure memory card that is connected to smart card connector 117 of the wireless portable computer 100 can have data read from the memory elements of the secure memory card 70 that is connected to the wireless portable computer 100, and have that data sent to the electronic lockbox over the low power radio link, thereby having the secure memory card's data "read" by the electronic lockbox CPU 16. Furthermore, if it is desirable to write data onto the memory elements 71 of a secure memory card 70, that function can occur while the secure memory card is connected to the smart card connector 117 of the wireless portable computer 100, by having the low power radio 27 of the electronic lockbox 10 transfer data to the wireless portable computer 100, and the CPU 116 can then write data onto the secure memory card, via the smart card connector 117. This could be accomplished to write the same types of data that would otherwise be written directly by the lockbox 10 to the secure memory card 70 as it is connected into the smart card connector 17 of the lockbox itself.

The use of secure memory cards offers many advantages with the electronic lockbox system for access to the lockbox, which is well documented in previous patents and patent applications filed by the same inventor of this patent document. To further enhance security, the lockbox can use data that the wireless portable computer 100 has retrieved over its wide area radio system (i.e., the WAN 110), such as the current (real time) decryption key for use with the secure memory card. If the wireless portable computer loses contact with the central computer system 260, or if the secure memory card is either lost or stolen, the decryption key update credentials of the wireless portable computer can be revoked at the central computer, thereby disabling further access to lockboxes by that secure memory card.

The electronic lockbox (either 10 or 800) will have the ability to store a software application program in its memory circuit 21, 23, 23 (or 821, 822, 823), and its processing circuit 16 (or 816) can execute the instructions of that software application program.

It should be noted that the use of secure memory cards, as discussed above, is becoming less important, particularly since by far the majority of real estate agents currently use smart phones in their daily activities, and companies that supply electronic lockboxes to those real estate agents are also providing various software APPS to make those agents more effective in their jobs. Therefore, the trend of the future will be to eliminate the secure memory cards, and instead rely solely on portable wireless computers, such as "electronic keys," or such as "smart phones," for communicating with electronic lockboxes, including for use in obtaining access to the building keys that are securely stored within those electronic lockboxes. A wireless lockbox that can be used with these portable wireless computers is described below. (Note that the popular name for executable software that runs on today's ubiquitous portable computers—such as smart phones, laptops, and tablets—is an "APP," which designation will often be used herein.

Lockbox with Wireless Communications

Figure 4:
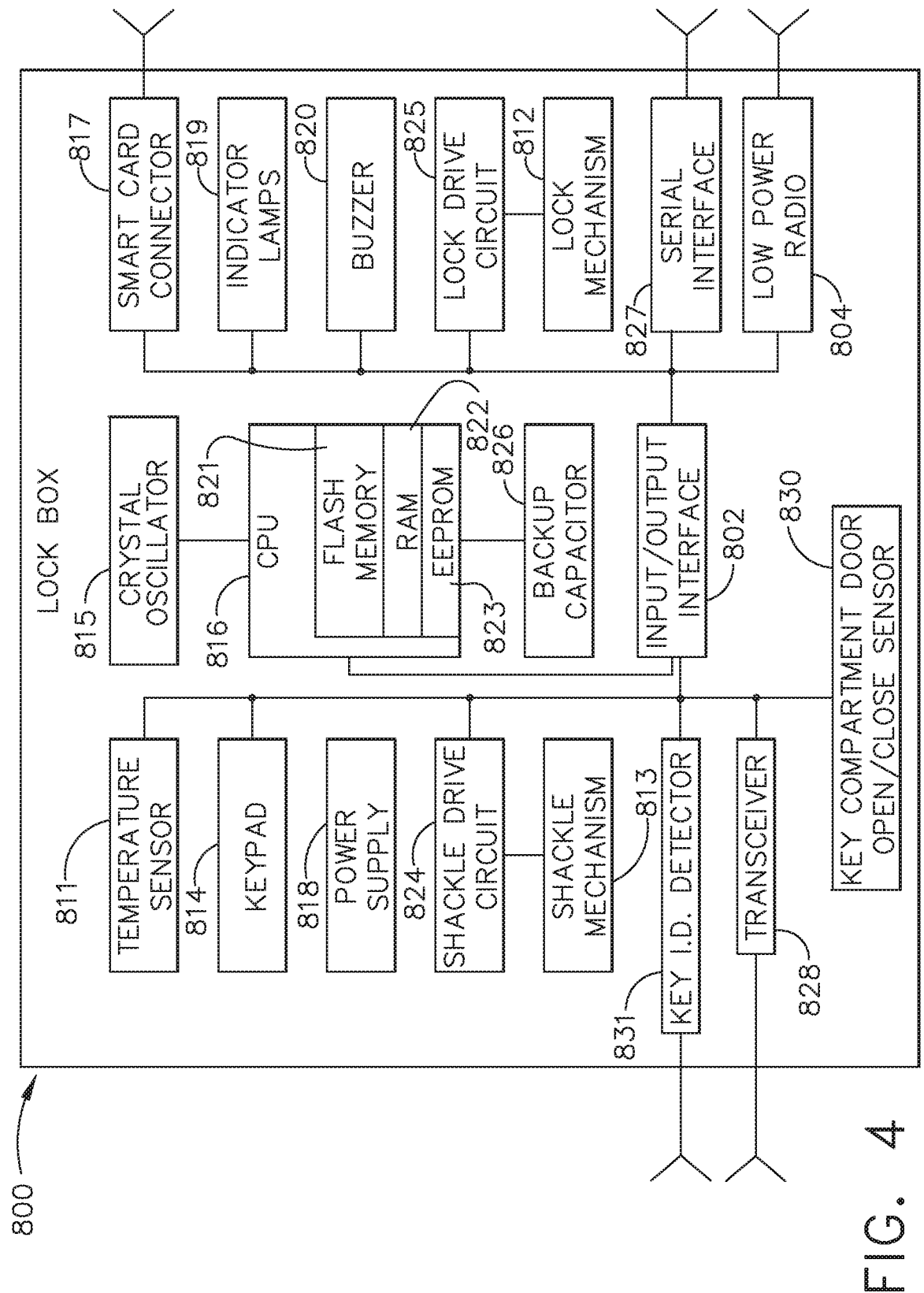
FIG. 4 is a block diagram showing some of the major hardware components of an electronic lockbox that communicates with a wireless portable electronic key, such as a "smart phone," and that also is able to communicate with an identification device, such as an RFID transceiver circuit, as constructed according to the principles of the technology disclosed herein.

An alternative lockbox design is provided in FIG. 4, which shows many of the major electronic components, generally designated by the reference numeral 800, in a block diagram. Most of the components listed in this block diagram are also found in the earlier versions of an electronic lockbox sold by SentriLock, LLC of Cincinnati, Ohio. A brief description of these components follows:

Electronic lockbox 800 includes a microprocessor (CPU) 816, FLASH memory 821, random access memory (RAM) 822, EEPROM (electrically erasable programmable read only memory) 823, a battery (or other electrical power supply) 818, a memory backup capacitor 826, an ISO-7816 smart card connector 817, indicator LED lamps 819, a piezo buzzer 820, a crystal oscillator 815, a digital temperature sensor 811 (these last two devices can be combined into a single chip) a shackle drive circuit 824, a shackle release mechanism 813, a key compartment mechanism drive circuit 825, a key compartment lock/release mechanism 812, and a membrane style keypad 814 for user data entry.

A serial interface 827 is also included so that the CPU 16 is able to communicate with other external devices, such as a separate portable computer in the form of a PDA (personal digital assistant) or other type of portable computing device that uses a serial data link. For example, serial interface 827 can comprise in infrared (IR) port that communicates with a standard IR port found on many PDA's; or it could use a different communications protocol, such as Bluetooth. A low power radio 804 is included for communications with a portable electronic key (not shown on FIG. 4). This radio 804 could have any number of types of communications protocols, including one that allows the lockbox 800 to exchange data with an electronic key in the form of a smart phone. A special software application program (an "APP") would run on the smart phone, to allow it to communicate with lockbox 800.

Microprocessor 816 controls the operation of the electronic lockbox 800 according to programmed instructions (electronic lockbox control software) stored in a memory device, such as in FLASH memory 821. RAM memory 822 is typically used to store various data elements such as counters, software variables and other informational data. EEPROM memory 823 is typically used to store more permanent electronic lockbox data such as serial number, configuration information, and other important data. It will be understood that many different types of microprocessors or microcontrollers could be used in the electronic lockbox 800, and that many different types of memory devices could be used to store data in both volatile and non-volatile form, without departing from the principles of this technology. In one mode of an exemplary embodiment, the electronic lockbox CPU 816 is an 8-bit Atmel Mega8 microcontroller that incorporates RAM 822, FLASH memory 821 and EEPROM memory 823 internally (as on-board memory).

Battery 818 provides the operating electrical power for the electronic lockbox. Capacitor 826 is used to provide temporary memory retention power during replacement of battery 818. It will be understood that an alternative electrical power supply could be used if desired, such as a solar panel with the memory backup capacitor.

An input/output (I/O) interface circuit 802 is provided so the microprocessor 816 can exchange data and operational signals with external devices, or with integral devices to the lockbox that require greater power than can be directly supplied by the microprocessor's pinouts. This puts the I/O circuit 802 in the pathway for virtually all signals that are used in the controlling of lockbox 800, including the data signals that are involved with the serial interface 827, the smart card connector 817, and the low power radio 804.

Electronic lockbox 800 generally includes a shackle (see item 946 on FIG. 5) that is typically used to attach the lockbox 800 to a door handle or other fixed object. However, it should be noted that stationary versions of these electronic lockboxes are now available that are permanently affixed to buildings, or other large object, and such stationary versions do not require shackles. One such stationary lockbox is illustrated in FIG. 6—see description below.

Figure 5:
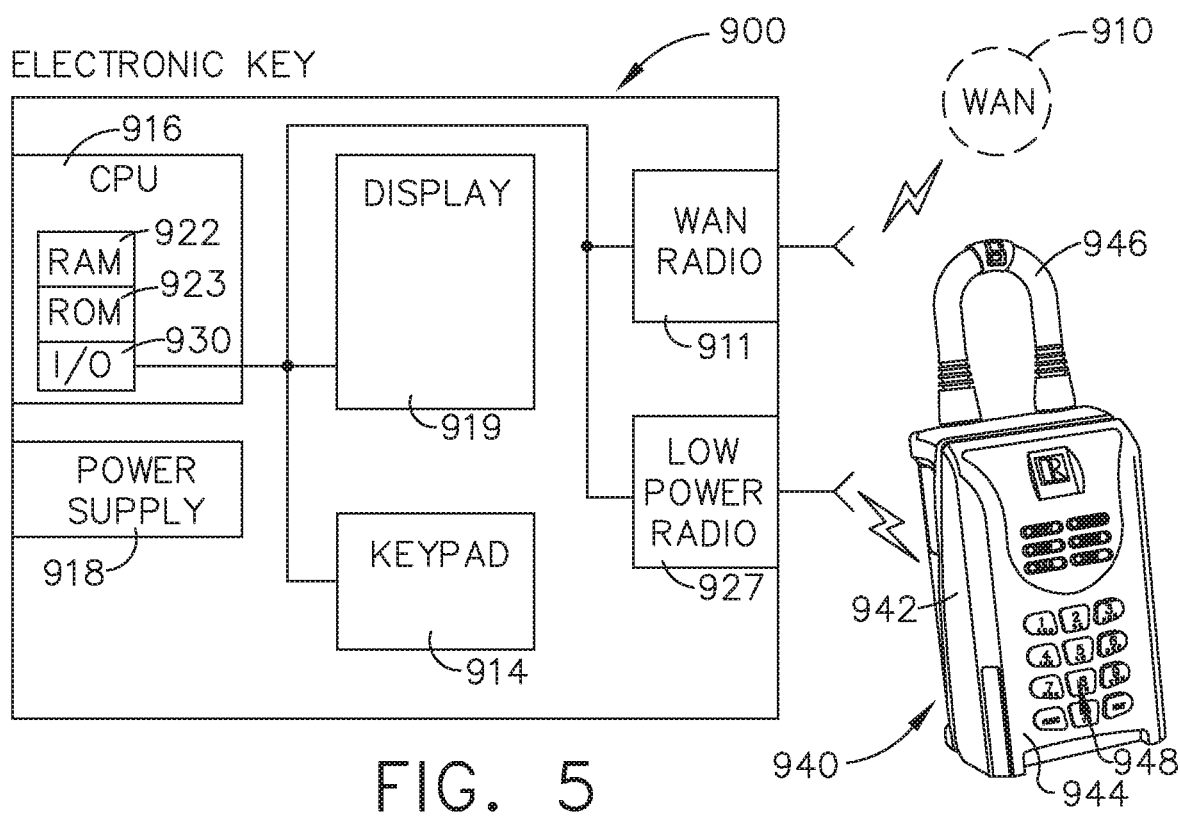
FIG. 5 is a block diagram showing some of the major hardware components of a portable electronic key that is capable of wireless communication with one of the electronic lockboxes of FIG. 1 or FIG. 4, for example, and that is capable of wireless communication with a wide area network, such as a cellular telephone system.
Figure 6:
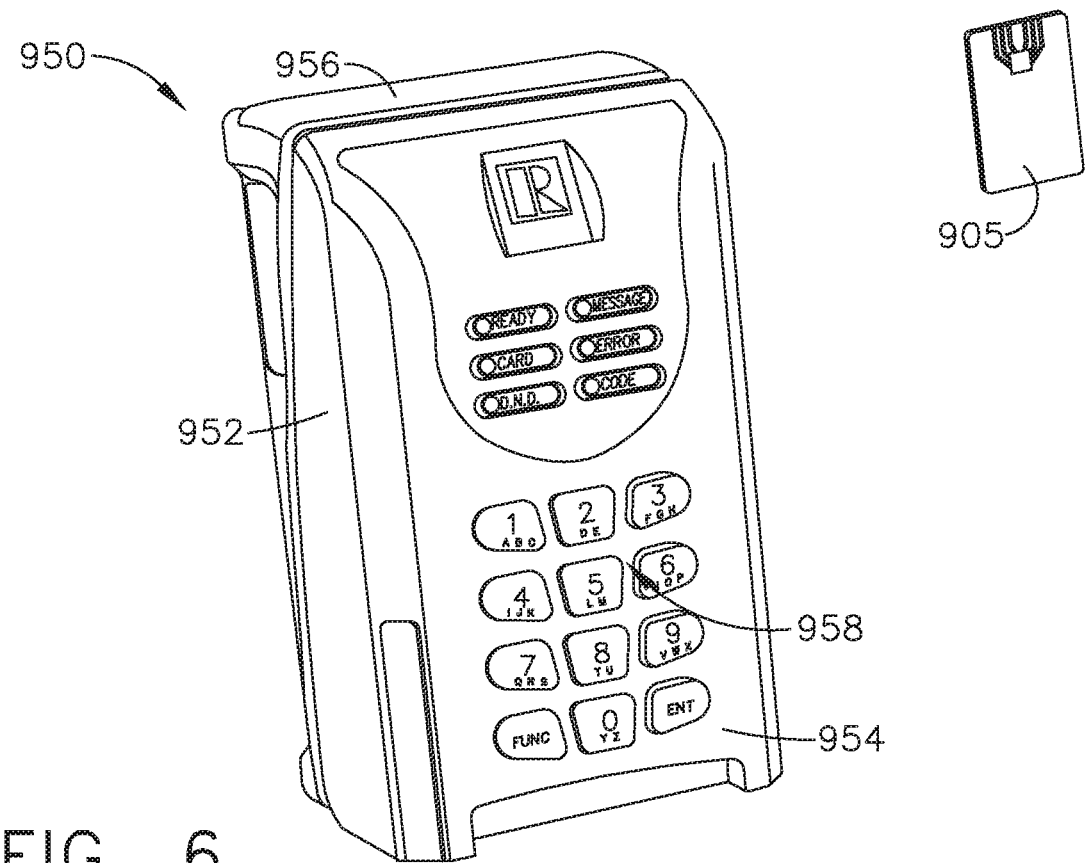
FIG. 6 is a perspective view of a stationary electronic lockbox, which includes the hardware components that are depicted in FIG. 1 or FIG. 4, for example.

Electronic lockbox 800 also includes a key compartment which typically holds a dwelling key (not shown), and which can be accessed via a key access door 32 (see FIG. 2), or a key access door 944 (see FIG. 5). Note that the structure called a "key access door" is also sometimes referred to herein as a "controlled access member." The key compartment's lock and release mechanism 812 uses a motor mechanism (not shown) that is controlled by drive circuit 825 that in turn is controlled by CPU 816. Shackle release mechanism 813 also uses a motor, which is controlled by drive circuit 824 that in turn is controlled by CPU 816. It will be understood that the release or locking mechanisms used for the shackle and key compartment can be constructed of many different types of mechanical or electromechanical devices without departing from the principles of the technology disclosed herein. It will also be understood that, in some physical locations, the lockbox may not require certain components that have been described above; for example, in some circumstances, a lockbox may not require a shackle, or it may not require a smart card reader.

The crystal oscillator 815 provides a steady or near-constant frequency (e.g., at 32.768 kHz) clock signal to CPU 816's asynchronous timer logic circuit. The ISO-7816 smart card connector 817 connects to smart card contacts to allow the exchange of data between the electronic lockbox's CPU 816 and the memory devices in the smart card. Note that, in today's more advanced lockboxes that are capable of wireless communications with an electronic key or a smart phone, the smart card connector 817 can become an optional feature, since it would be rarely used, if ever by most human users.

In one embodiment, the digital temperature sensor 811 is read at regular intervals by the electronic lockbox CPU 816 to determine the ambient temperature. Crystal oscillator 815 may exhibit a small change in oscillating characteristics as its ambient temperature changes. In one type of crystal oscillator device, the oscillation frequency drift follows a known parabolic curve around a 25 degrees C. center. The temperature measurements are used by CPU 16 in calculating the drift of crystal oscillator 815 and thus compensating for the drift and allowing precise timing measurement regardless of electronic lockbox operating environment temperature. As noted above, a single chip can be used to replace the combination of crystal oscillator 815 and temperature sensor 811, such as a part number DS32KHZ manufactured by Dallas Semiconductor.

LED indicator lamps 819 and a piezo buzzer 820 are included to provide both an audible and a visual feedback of operational status of the electronic lockbox 800. Their specific uses are described in detail in other patent documents by the same inventor. Backup capacitor 826 is charged by battery 818 (or perhaps by another power source) during normal operation.

The lockbox 800 can also be optionally equipped with a transceiver 828 that works with near field communications ("NFC") equipment, and perhaps could be used to detect RFID chips, for example. In addition, such NFC circuits may be used for communicating with many other electronic products that have become common at many commercial establishments; so much so that most new smart phones are equipped with such an NFC transceiver (which typically includes a low-power microcontroller circuit).

Electronic Key

Referring now to FIG. 5, a block diagram is provided for showing many of the major electronic components of an electronic key, generally designated by the reference numeral 900. Part of FIG. 5 also diagrammatically shows certain other system components, such as a wide area network 910 and an electronic lockbox 940. This particular lockbox includes a housing 942, a movable door 944 that covers a secure compartment beneath its surface, a shackle 946, and a keypad 948 for entering data via a human user. It should be noted that alternative lockbox designs are available that have no shackle whatsoever, and that have a different type of secure compartment in which at least a portion of the entire secure compartment is movable.

The electronic key 900 includes a microprocessor 916, which typically has on-board memory and interface components. On FIG. 5, the on-board memory circuit includes some RAM at 922, and ROM (or EEPROM) at 923. An input/output (I/O) interface circuit is depicted at 930. These on-board hardware components can be similar to those of the electronic lockbox, if desired. However, they are more likely to be part of a smart phone, which typically has very highly capable processing power and relatively large memory capacity.

Other hardware components of electronic key 900 include a power supply 918 (typically a battery), a display 919, a keypad 914 (which typically is part of a touch screen display, particularly if the electronic key is a smart phone and the display viewing area is large), a wide area network (WAN) radio circuit 911, and a low power radio circuit 927. The two radio circuits each have their own built-in antennas, as required for their broadcast and receive frequencies. The WAN radio 911 is designed to communicate with a wide area network, generally designated by the reference numeral 910; if electronic key 900 is a smart phone, for example, then the wide area network would generally be a cellular telephone network.

The low power radio circuit 927 is designed to communicate with one of the lockboxes of the overall security system. More specifically, the lower power radio 927 will exchange data messages with the low power radio circuit 804 of an electronic lockbox 800, as depicted on FIG. 4, or perhaps with the low power radio circuit 27 of an electronic lockbox 10, as depicted on FIG. 1. In the present technology disclosed herein, these low power radio circuits 927, 804, and perhaps 27, could comprise WiFi or Bluetooth technology, particularly if the electronic key 900 is a smart phone. Of course, other communication protocols could be utilized without departing from the principles of the technology disclosed herein. As noted above, a special APP would run on the smart phone (as the electronic key 900), to allow it to communicate with a lockbox 800. The electronic key can be in the form of a smart phone, as noted above, and it also is sometime referred herein to as a "wireless portable computer" (or "WPC").

It should be noted that the electronic lockbox 940 illustrated in FIG. 5 can also be accessed by use of a standard SentriLock, LLC smart card, such as the secure memory card depicted at 905 on FIG. 5. However, many of the features of the technology disclosed herein use the "instant" communications capabilities of an electronic key, including those in the form of a smart phone, for communicating both with a lockbox and with the central computer, in real time, or near-real time. Again, such devices can also be referred to as "wireless portable computers" (WPCs).

Newer Design Wireless Lockbox

Figure 7:
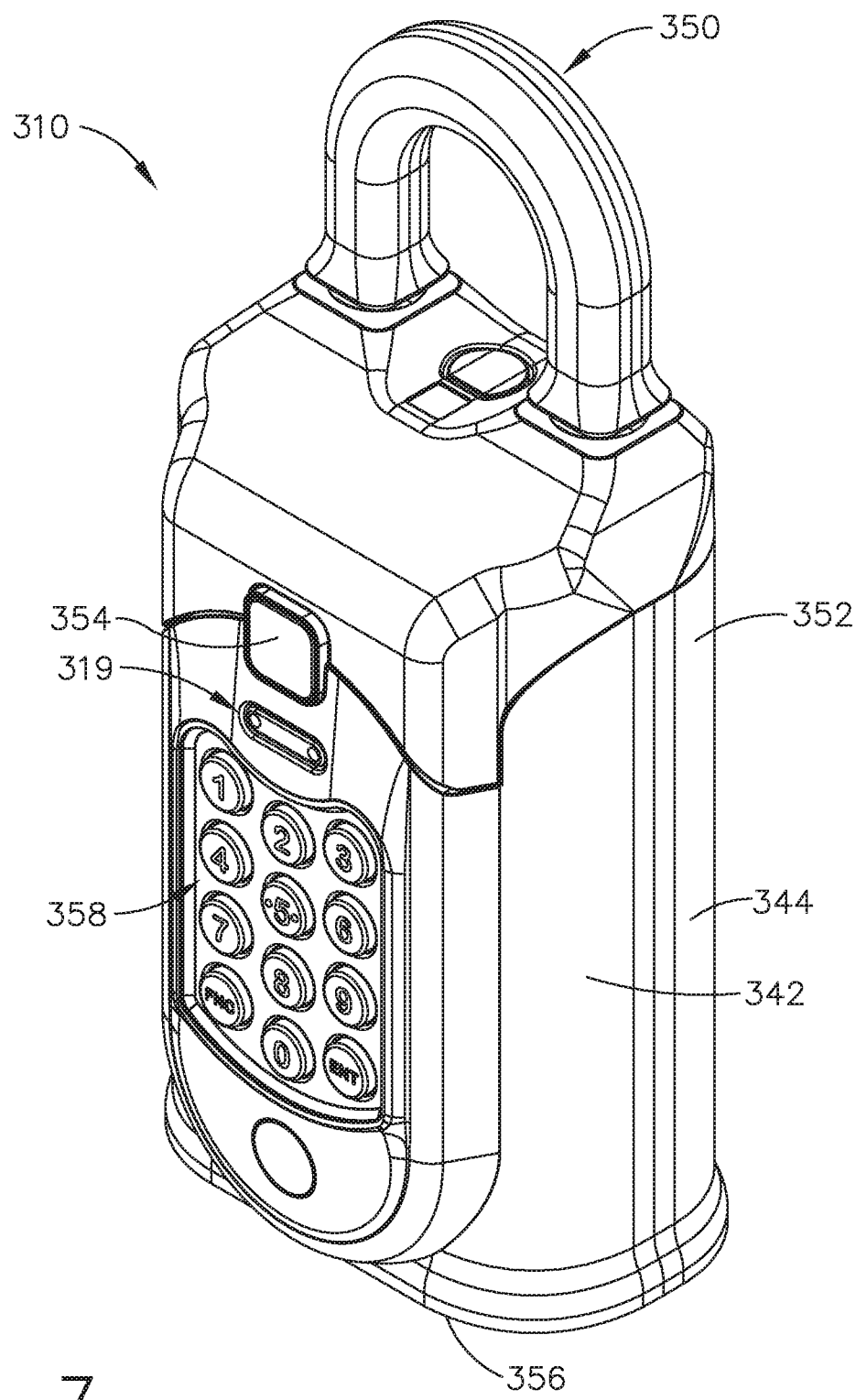
FIG. 7 is a front perspective view of an alternative embodiment lockbox, as constructed according to the principles of the technology disclosed herein.

Referring now to FIG. 7, an exemplary embodiment of a newer design electronic lockbox is generally designated by the reference numeral 310. The lockbox has an outer housing (or enclosure or casing) 352, a shackle 350, and a bottom portion of the key bin 356 which is located at the bottom portion of the casing 352. The upper housing of lockbox 310 includes two receptacles (openings) that receive a shackle 350. The shackle 350 has an upper portion and two shackle extensions that fit through the receptacles. The front of the lockbox has a keypad 358, which can be used by a sales agent or other authorized person to enter data to the lockbox's control system. Above the keypad is an indicator LED lamp 319, which will indicate various status states of the lockbox during its operations, and a label, or display, 354.

The keypad 358 may also be referred to as a "data input circuit," in which a human user may press one or more of the keys to enter data, such as numeric information. It will be understood that future versions of electronic lockboxes may someday include a touchscreen display, and in such a design, the keypad will be incorporated directly into that display, and thus the touchscreen display itself would become the data input circuit.

As noted above, electronic lockbox 310 includes a shackle 350 that is typically used to attach the lockbox 310 to a door handle or other fixed object. Electronic lockbox 310 also includes a key compartment which typically holds a dwelling key (not shown), and which can be accessed via the key bin 340.

Figure 8:
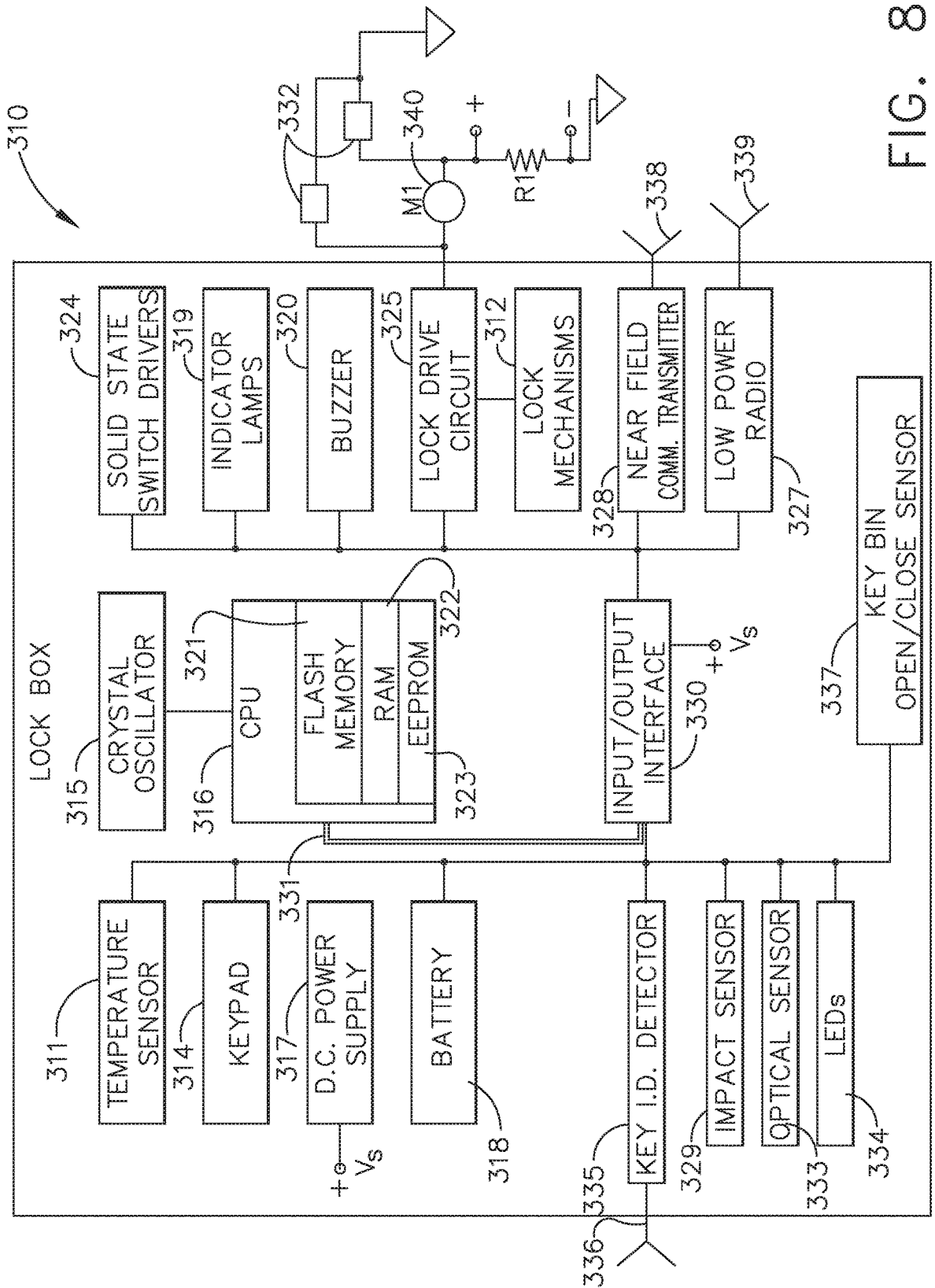
FIG. 8 is a block diagram of the lockbox of FIG. 7.

The main components of the electronic circuitry of electronic lockbox 310 is illustrated in block diagram form in FIG. 8. In this illustrated embodiment, electronic lockbox 310 includes a microprocessor or microcontroller (CPU) 316, FLASH memory 321, random access memory (RAM) 322, EEPROM (electrically erasable programmable read only memory) 323, a battery (or other electrical power supply) 318 (power supply 318 on FIG. 8 is electrically equivalent to a battery), a D.C. power supply 317, indicator LED lamps 319, a piezo buzzer 320, a crystal oscillator 315, a digital temperature sensor 311 (these last two devices can be combined into a single chip), at least one solid state switch driver 324, a lock drive circuit 325, a rotatable actuator to act as a shackle lock/release mechanism 312, and a membrane style keypad 314 for user data entry. (Keypad 314 on FIG. 8 is electrically equivalent to the external keypad 358 seen on FIG. 7). An impact sensor 329 can also be included in electronic lockbox 310, to detect abnormal mechanical forces that might be applied to the lockbox.

An input/output (I/O) interface circuit 330 is included to provide signal conditioning as needed between the CPU 316 and other components that typically use voltage and/or current levels that are not typically able to directly connect to a processing circuit, such as sensors and output device driver circuits. Each appropriate I/O signal is directed through a separate channel of the I/O interface circuit 330, unless perhaps more than one signal of a particular voltage and current rating can be multiplexed, in which case a multiplexer circuit can be included in the I/O interface circuit 330. The data signals between I/O circuit 30 and the CPU 16 run through a low voltage signal bus 331.

A data interface in the form of a low power radio 327 with an antenna 339 is included in this embodiment so that the CPU 316 is able to communicate with other external devices, such as a separate portable transponder that uses a compatible wireless data link. (The portable transponder can also be referred to as a "mobile device," a "portable communications device," an "electronic key," a "wireless portable computer" (or "WPC"), or a "smart phone" in some embodiments of this technology.) The portable transponder also includes a low power radio, which communicates with the lockbox radio 327 using a protocol that could be proprietary, if desired. However, these radios could use any number of various communications protocols, such as Bluetooth, although the data structure in the messages between these radios certainly could be encrypted (or otherwise formatted) in a proprietary manner.

The radio 327 further could comprise some other type of wireless communications circuit that may not operate on a strictly radio principle, including types of wireless communications transmitters or receivers that have not been invented as of yet. In this description, such wireless communications devices will typically be referred to as "radios;" however, in this patent document they may also be referred to as a "short range wireless communications device," a "low power wireless communications device," a "short range wireless transmitter" (and/or receiver), or a "low power wireless transmitter" (and/or receiver).

This radio 327 could have any number of types of communications protocols, including one that allows the lockbox 310 to exchange data with an electronic key in the form of a smart phone. A special software application program (an "APP") would typically run on the smart phone, to allow it to communicate with lockbox 310.

A near field communications (NFC) transmitter 328 with antenna 338 is also included so that the CPU 316 is able to communicate with other external devices, such as a separate portable computer in the form of a PDA (personal digital assistant), a smart phone, or other type of portable computing device that uses NFC. For example, NFC transmitter 328 can comprise an RFID port that communicates with a standard RFID port found on many PDA's; or it could use a different communications protocol.

One preferred processing circuit for use in this control system is a microcontroller chip made by Texas Instruments, part number CC2642. This microcontroller integrated circuit includes a microprocessor portion (with a 16-Bit RISC Architecture), a memory portion, a serial communications interface portion, and an analog signal interface portion (a 10-Bit A/D converter). Therefore, this single integrated circuit essentially contains all the components needed to make up the processing circuit 316, memory circuit 322, and most of the components necessary for the NFC transmitter 328, which is why it is called a microcontroller, rather than a mere microprocessor or microcomputer. An updated version of the preferred processing circuit is a Texas Instruments 32-bit microprocessor, part number CC2642RB.

The microprocessor 316 controls the operation of the electronic lockbox 310 according to programmed instructions (electronic lockbox control software) stored in a memory circuit, such as in FLASH memory 321. RAM memory 322 is typically used to store various data elements such as counters, software variables and other informational data. EEPROM memory 323 is typically used to store more permanent electronic lockbox data such as serial number, configuration information, and other important data.

It will be understood that many different types of microprocessors or microcontrollers could be used in the electronic lockbox system 310, and that many different types of memory circuits could be used to store data in both volatile and non-volatile form, without departing from the principles disclosed herein. In one mode of an exemplary embodiment, the electronic lockbox CPU 316 is a microcontroller that incorporates RAM 322, FLASH memory 321 and EEPROM memory 323 internally (as on-board memory).

The power supply 318 typically comprises a battery that provides the operating electrical power for the electronic lockbox 310. It will be understood that an alternative electrical power supply could be used if desired, such as a solar panel with a memory backup capacitor.

An input/output (I/O) interface circuit 330 is provided so the microprocessor 316 can exchange data and operational signals with external devices, or with integral devices to the lockbox that require greater power than can be directly supplied by the microprocessor's pinouts. This puts the I/O circuit 30 in the pathway for virtually all signals that are used in the controlling of lockbox 310, including the data signals that are involved with the NFC transmitter 328, and the low power radio 327.

The lock and release mechanism 312 uses a gear motor mechanism (not shown on FIG. 8) that is controlled by a drive circuit 325 that, in turn is controlled by CPU 316. It will be understood that the release or locking mechanisms used for the shackle latch pin 66 and key bin latch pin 86 can be constructed of many different types of mechanical or electromechanical devices without departing from the principles disclosed herein.

The crystal oscillator 315 provides a steady or near-constant frequency (e.g., at 32.768 kHz) clock signal to CPU 316's asynchronous timer logic circuit.

It should be noted that an electronic key (such as that described above) could be used as a type of secure memory circuit, if desired. Such an electronic key would also contain memory elements, and perhaps would contain some control logic circuits, depending on the type of electronic key that is used. With regard to FIG. 8, if an electronic key is used, it could be interfaced to the CPU circuit 316 of the electronic lockbox 310 in many different ways, including via an electrical circuit that makes contact between the lockbox 310 and the electronic key, or perhaps via an electromagnetic signal such as a short range radio wave, or an optical signal. As used herein, the term "electronic key" can have a meaning to include a relatively simple device, such as a secure memory card (or a smart card), and it can have a meaning to include a sophisticated device, such as a laptop computer or a smart phone that has a wireless communications circuit to send and receive messages from other devices, including an electronic lockbox and/or a central clearinghouse computer. A "typical" electronic key for use with lockbox 310 will generally be a more sophisticated device.

In one embodiment, the digital temperature sensor 311 is read at regular intervals by the electronic lockbox CPU 316 to determine the ambient temperature. Crystal oscillator 315 may exhibit a small change in oscillating characteristics as its ambient temperature changes. In one type of crystal oscillator, the oscillation frequency drift follows a known parabolic curve around a 25 degrees C. center. The temperature measurements are used by CPU 316 in calculating the drift of crystal oscillator 315, thus compensating for the drift and allowing precise timing measurement regardless of electronic lockbox operating environment temperature. As noted above, a single chip can be used to replace the combination of crystal oscillator 315 and temperature sensor 311, such as a part number DS32KHZ manufactured by Dallas Semiconductor.

The LED indicator lamps 319 and piezo buzzer 320 are included to provide both an audible and a visual feedback of operational status of the electronic lockbox 310. Their specific uses are described in detail in other patent documents by the same inventor, as noted below. The keypad 314 preferably is a self-contained intelligent device, with its own processing circuit, such as a TI MSP430G2333.

The impact sensor 329 can be used to notify an external device, in case of an attempted removal or other type of damage being done to the lockbox 310, including intentional damage. Such an external device could comprise a "base station" as described in detail in other patent documents by the same inventor, or it could comprise a portable transponder or an electronic key.

A typical electronic lockbox system will include one or more electronic lockboxes, one or more portable transponder devices (such as "electronic keys"), a central clearinghouse computer system (also sometimes referred to as a "CCC"), and a wireless data communications system, typically having an Internet connection, and a mobile communications service provider. The central clearinghouse computer typically will include a database which contains a repository of electronic lockbox identification and attribute information, and also contains a repository of information about real estate agents. A computer controls the database, and includes a processing circuit and a memory circuit (in addition to any bulk memory storage devices that contain the database).

A typical electronic lockbox 310 is able to communicate with a portable transponder (or "electronic key") which includes a low power radio that can communicate data to and from the low power radio 327 of the electronic lockbox 310. If the portable transponder includes a wide area network radio, which would typically be the case for a smart phone, then such portable transponder will be able to communicate to the clearinghouse computer over a wide area network (WAN). Assuming that the mobile communications service provider is a cellular telephone system, the portable transponder will have the capability of essentially immediate communications with the clearinghouse computer from many, many locations, including most locations where an electronic lockbox 310 has been situated.

The wide area network radio further could comprise other types of wireless communications devices that may not operate on a strictly radio principle, including types of wireless communications devices that have not been invented as of yet. In this description, such wireless communications devices are sometimes referred to as "radios;" however, in this patent document they may also be referred to as a "wide area network wireless communications device," or as a "medium range wireless communications device." They can also be referred to as a "wireless transmitter" and/or a "wireless receiver," which implies either a radio or some other form of optical energy communications circuit; it could also imply transmitters and receivers that operate in wavelengths longer that typical "radio waves."

Some optional sensors can also be included in the lockbox 310 to enhance its overall performance, if desired by the system designer. For example, the key compartment cover (or door) can include an optional sensor that detects whether it is open or closed, which is designated by the reference numeral 337 on FIG. 8. This type of sensor has become a standard feature for lockboxes sold by SentriLock, LLC. There may be other lockbox manufacturers who are not using that type of sensor as a standard feature at this time, but may do so in the future.

Another optional sensor could be a dwelling key identification detector, designated by the reference numeral 335 on FIG. 8. This device would have the ability to detect the status of the identity of a key that has been placed inside the key compartment. One design for this type of device could be to use a RFID tag that is attached to a regular dwelling key of any type. The detector 335 would then comprise an RFID detector circuit, which can easily identify the correct RFID tag if the dwelling key with that particular RFID tag has been successfully placed back into the key compartment. Such a key detector 335 may well include an antenna 36.

The optical sensor package 333 that is included on the block diagram of FIG. 8 includes photosensors. This optical sensor package 333 will communicate with the input/output interface circuit 330, which provides a supply voltage $V_S$, as needed for the various I/O devices, including for LEDs 334 that are part of the optical sensor package.

In the new-design lockbox technology that is disclosed herein, the lock drive circuit includes a motor 340, as described above, also referred to as motor "M1" of FIG. 8. In addition to a "normal" motor driver circuit, the lockbox 310 disclosed herein may include a current-sensing circuit, such as that illustrated in FIG. 8. As an example sensing circuit, a resistor of relatively low resistance value, but relatively high power rating (in watts) could be included in series with the drive coil of the motor M1. In this example, the resistor is designated "R1" on FIG. 8, and is positioned on the low-voltage side of the motor coil M1, between that coil and lockbox DC common. When current passes through the motor coil and through R1, a relatively low voltage is induced in the resistor R1; that voltage can be detected (with a differential voltage amplifier) to monitor the drive current of the motor M1.

The two motor leads are both connected to separate switching transistors, indicated at reference numeral 332 on FIG. 8. When the motor M1 is turned off, both transistors 332 can be turned on to effectively short-circuit the motor windings to DC common, thereby increasing the backdrive torque of the motor. This increase in backdrive torque helps to prevent the motor, and its mechanically-coupled motor spur gear, its movable indicator disk, and a bottom sleeve from being rotated at times when the motor is de-energized.

High Level System Operation

Figure 3:
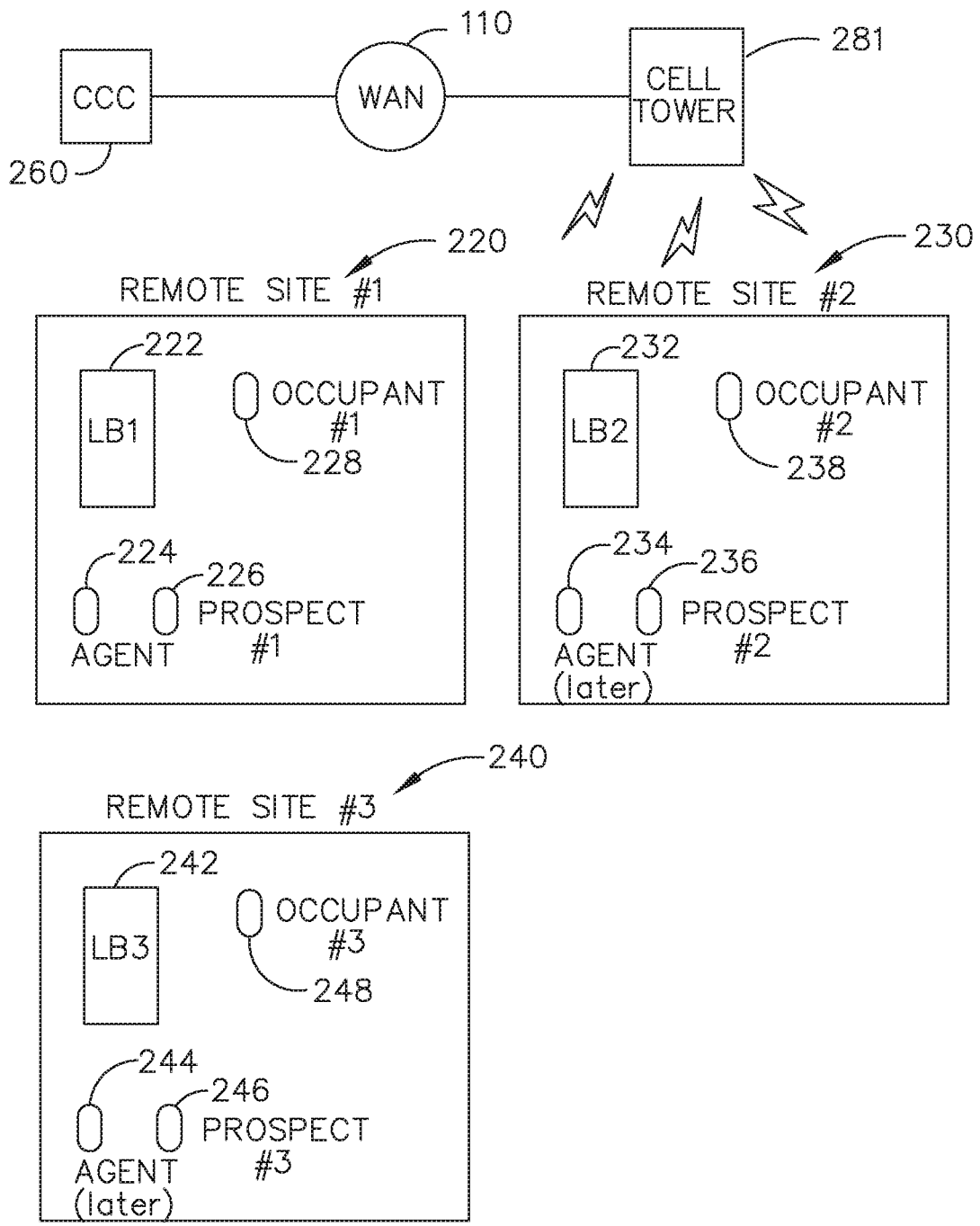
FIG. 3 is a diagrammatic view of some of the major components used on an electronic lockbox security system, including a central computer station, a wide area network that communicates with a cellular telephone system, and three electronic lockboxes such as that of FIG. 1, in which human users are "stationed" near those lockboxes, and each human user carries a smart phone that can communicate with either the proximal lockbox, or with the central computer station via the cellular telephone system.

Referring now to FIG. 3, the central computer 260 is in communication with a wide area network (such as the Internet) 110, which is in communication with a cellular telephone system, represented by the cell tower 281. From there, any number of human users can be in communication with the central computer, via this well-known electronic equipment. On FIG. 3, there are three remote sites illustrated, generally designated by the reference numerals 220, 230, and 240. Each of these remote sites represents a real estate property that is for sale, in the following example.

A real estate agent has scheduled three appointments in a single day; these appointments are at three different physical property locations (i.e., at remote sites 220, 230, and 240 in this example). Thus, this real estate agent is a "showing agent" in this example, as he will be showing these three different properties to three different potential buyers (who are designated as "Prospect #1", "Prospect #2", and "Prospect #3). Furthermore, the showing agent's appointment schedule is designed such that he will spend X minutes with Prospect #1 at Remote Site #1, then travel to Remote Site #2 where he will spend Y minutes with Prospect #2, and then travel to Remote Site #3, where he will spend Z minutes with Prospect #3. There is an electronic lockbox at each of these remote sites, and there is a human occupant at each remote site. Those human occupants are designated "Occupant #1", "Occupant #2", and "Occupant #3" on FIG. 3.

On FIG. 3, each human being has a smart phone. The three occupants, in numeric order, have smart phones 228, 238, and 248; the three sales prospects, in order, have smart phones 226, 236, and 246. The showing agent has a single smart phone, which has a different numeric designation depending upon his physical location, for the sake of this example. When visiting the three remote sites, the agent's smart phone is designated, in order, as 224, then 234, then 244. It is assumed that every smart phone in this example (and in following descriptive examples herein) is capable of communicating with each other electronic device that is on site, or via the cellular telephone system. For example, the showing agent will have the capability of communicating directly with his on-site prospect, via Bluetooth, for example, or via the cellular telephone system. The showing agent will also have the capability of communicating with the on-site lockbox, and—if not out of range—with the cellular tower, and hence with the central computer. For some functions, the sales prospect will also have the capability of communicating with the central computer (via the cellular telephone system). Finally, the occupants will have the capability of communicating with the central computer, via the cellular telephone system, so as to at least receive messages and being able to respond to such messages, regarding appointment times.

At his first appointment, the showing agent will meet prospect #1 at the remote site #1, and obtain access to the first electronic lockbox 222, also designated at "LB1" on FIG. 3. The occupant #1 is not supposed to be on the premises at that time, in this example. After the showing is finished, the agent drives to remote site #2 to meet prospect #2, and obtain access to the second electronic lockbox 232, also designated at "LB2" on FIG. 3. The occupant #2 is not supposed to be on the premises at that time, in this example. After that showing has finished, the agent drives to remote site #3 to meet prospect #3, and obtain access to the third electronic lockbox 242, also designated at "LB3" on FIG. 3. The occupant #3 is not supposed to be on the premises at that time, in this example.

Unfortunately, the planned schedules for such activities of a showing agent often do not go strictly as planned, i.e., according to the original schedule of appointments. Therefore, a new function would be useful for handling that all-to frequent situation.

System Control Over Appointments

In the electronic lockbox systems described hereinabove, an authorized user's appointment schedule is known as well as the geolocations of the properties that are desired to be visited with each given client. The authorized user is designated as the "visiting agent" which, in the examples below, is a real estate agent who will be "showing" a property to a sales prospect—i.e., a potential buyer of that real estate property that is being visited. It will be understood that other parties are involved in these situations: in real estate sales, there is an "owner" of the property, and there is a human "occupant" of the property—often both the owner and the occupant are the same individual.

Note: there also will be an "owning agent," who owns (or otherwise controls) the electronic lockbox that has been placed on that property. In many real estate sale organizations, that "owning agent" is commonly referred to as the "listing agent." On the other hand, the "owning agent" could be the building owner, or even the government, depending on what type of property is being visited. In all cases, there needs to be some person (human or organizational) that controls the installation of the lockbox on the property, and that person has a vested interest in seeing that the property visits are conducted appropriately—i.e., in a safe manner for the "occupant" or property "owner" and, furthermore, at a time that is not inconvenient for that occupant.

The combination of the appointment schedule, the property location, and personnel information allow the control system to perform periodic monitoring and computation of the current location of the real estate agent, the time required to traverse over roads to reach the next location, and whether the combination of those factors will necessitate a rescheduling of a property showing due to a delayed departure from the previous showing.

As an initial matter, when a showing appointment is scheduled, the lockbox control system provides a specific set of time-limited credentials to the showing agent, thus allowing access to the key in the lockbox only during that scheduled time period. This type of scheduling ability has been available for some time.

When an Appointment Becomes Delayed

A rescheduling process begins with an identification that the (future) scheduled appointment either cannot be met, or will not successfully occur within a predetermined appointment time interval—including an evaluation of expected travel time by the person who is travelling to the physical location where the appointment is to occur. In this example, an alert notification is provided to the real estate showing agent (e.g., on his smart phone 224) indicating the next scheduled appointment will be missed by an amount greater than a threshold established in the control system. The showing agent can then create an estimate for a new departure time, and send that information to the central computer 260 (i.e., the control system). This information is combined with the determined (calculated) drive time from the current location (e.g., the remote site 220) to the next location (e.g., the remote site 230).

An updated estimated time of arrival is determined by the central computer 260, and the homeowner (or the Occupant #2, via smart phone 238) and the appropriate listing agent (not shown on FIG. 3) are advised as to the new showing start time. The control system then prompts them (the listing agent and Occupant #2) as to whether the new showing time is acceptable. If it is, the potential buyer (e.g., Prospect #2) is notified (using smart phone 236) and the time-limited access credentials for that electronic lockbox (i.e., LB2 at 232) are sent to the showing agent's smart phone (at 224), thereby replacing the old access credentials for LB2. If the appointment change is declined either by the seller (e.g., the Occupant #2) or by the seller's agent, the access credentials are removed from the showing agent's smart phone.

The control system described herein can also cascade through all future appointments that have been scheduled during the day, and determine if one or more future appointments is in jeopardy of being missed. In this example of FIG. 3, that would include the future appointment at remote site #3, in which the Occupant #3 would potentially be affected, and further, a different listing agent could be involved in any attempted changes in that showing schedule.

An enhancement to this control system can be made available to the users; the visiting agent can carry a smart phone with a GPS receiver, and the central computer can use his GPS coordinates to calculate his current physical position (essentially in real time). With that information, the central computer can calculate his travel time to the next lockbox location to automatically create an appropriate new, time-shifted appointment time. This location "measurement" and "calculation" can be updated in real time (or "near-real time"), as the visiting agent is actually travelling to that next (delayed) appointment location. In large cities, the near-real time "updating" determination can be important, as travel times can be significant.

As discussed before, if the central computer provides a new appointment time, automatic messages can be sent to other interested parties, such as the building owner, the home dweller (e.g., if that is a different person than the building owner), the owning agent (i.e., the "listing agent" in a real estate sales situation), and perhaps a government worker who might also be invited to the appointment (e.g., a fire department official who is visiting an office building to witness a fire pump startup test). Any one of those interested parties can have the ability to decline the proposed new (re-scheduled) appointment time. The situation where someone declines a re-scheduled appointment time can be extremely important for everyone involved, including the visiting agent, who otherwise—i.e., without knowledge of the declined approval request—would drive all the way to that "next" lockbox, only to find out that he cannot access the building key, after all. If the visiting agent is a real estate sales agent, then the potential buyer would likely (needlessly) show up, too. Obviously, that is an undesirable situation, which occurs often enough in today's conventional lockbox systems.

FIGS. 9-13 illustrate flow charts that describe in greater detail the schedule controlled access algorithm behind this appointment scheduling system.

Figure 9:
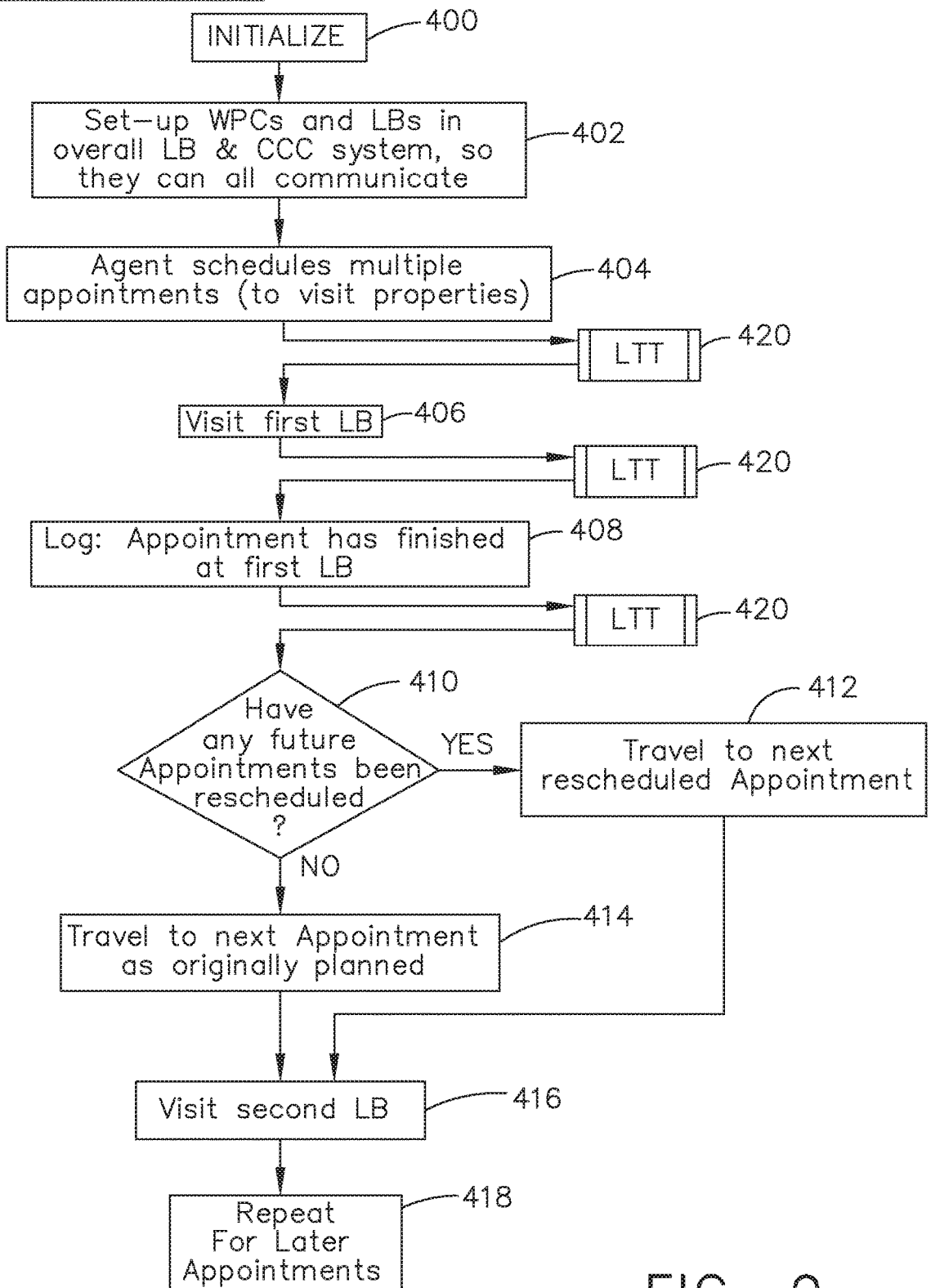
FIG. 9 is a flow chart of certain steps performed during a "schedule controlled access function," as used in the system depicted in FIG. 3.

Referring now to FIG. 9, in a flow chart begins with an initialization step 400. After that occurs, the first function step at 402 is to set-up the WPCs (or smart phones) and LBs ("lockboxes") in the CCC system, so that all these devices can communicate with one another. In a next step at 404, a showing agent (or "visiting agent") schedules multiple appointments to visit properties. The next step is a step 420, where the system executes a Location and Time to Travel Routine (the "LTT" or "LTT Routine").

Figure 10:
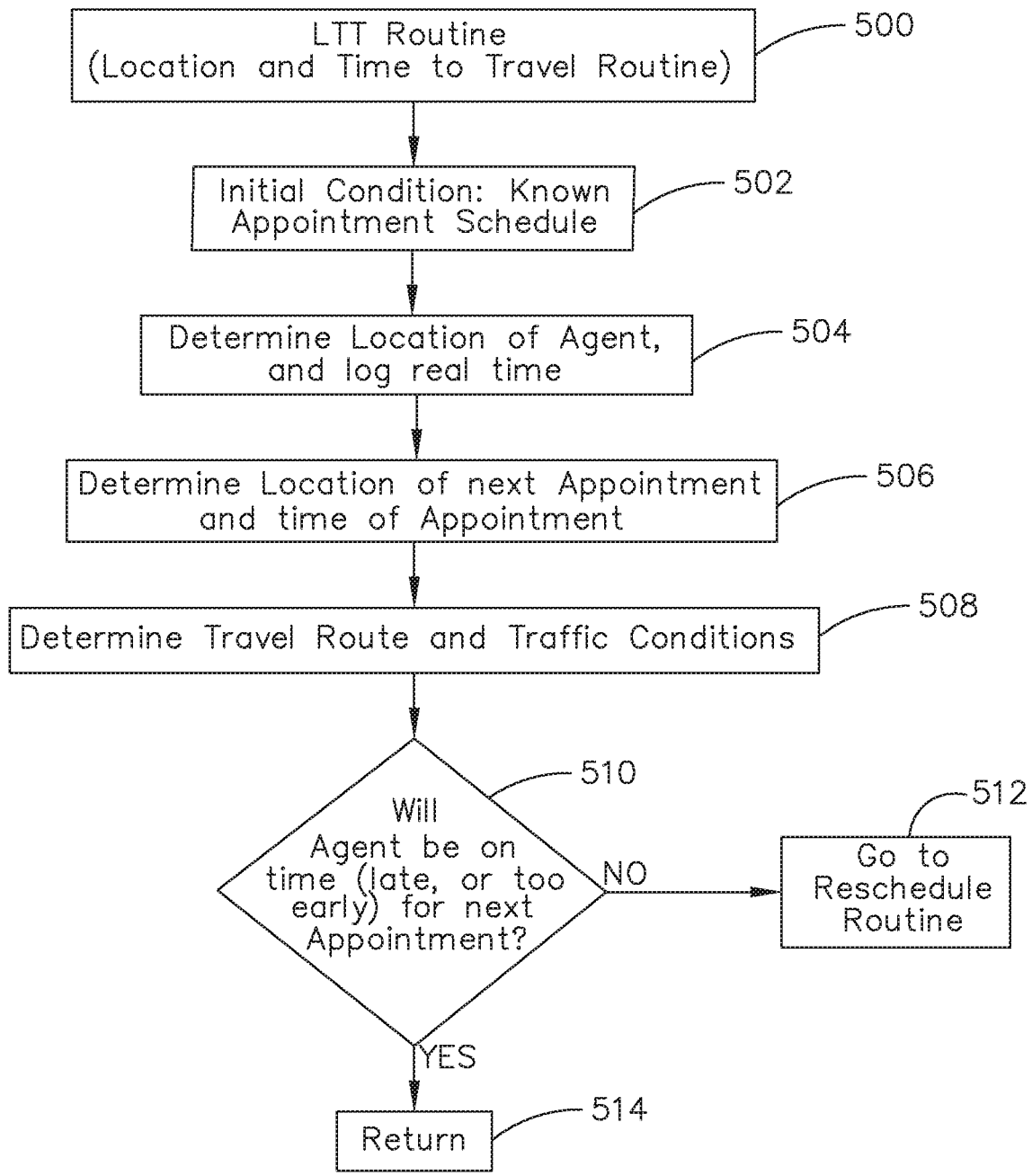
FIG. 10 is a flow chart of certain steps performed during an "LTT Routine," as used in the system depicted in FIG. 9.

Referring now to FIG. 10, a flow chart illustrates the LTT Routine starting at a step 500. A next step 502 requires an initial condition to be available, which comprises a known appointment schedule. This is the same schedule that a showing agent input into the system at step 404, as depicted in FIG. 9. Next, at a step 504, the system determines the physical location of the agent, and logs the real time. Typically, this will be based upon the GPS location of the showing agent's smart phone, and the real time according to the clock of the central computer (the CCC).

At a step 506, the system determines the location of the next appointment and time of that appointment, for that showing agent. Then, at a step 508, the system determines that agent's travel route and known traffic conditions on that route (to calculate prospective drive time for that route). At a decision step 510, the system then determines if that agent will be on time for the next appointment. Based on the results of steps 504, 506, and 508, the system can determine an accurate estimate of the showing agent's travel time to the next appointment. If the system determines that the agent will be on time, then the logic flows to a step 514 and returns to the main algorithm (depicted on FIG. 9). However, if the system determines that the showing agent will be late, then the logic flows to a step 512, and goes to a "Reschedule Routine." Alternatively, if the showing agent is attending a showing in which the prospective client wants to visit the property for a longer time period than was first scheduled, then the showing agent can request to extend the time for that showing, but by doing so, the agent (and potentially that same client) may be late for the next appointment. In that event, the system can direct the logic flow to step 512, i.e., the "Reschedule Routine," and attempt to automatically reschedule the future appointment(s), as needed.

The system can determine an agent's physical location via the GPS receiver on an agent's wireless portable computer, for example. (This could be an automatic function that is controlled by the CCC, while accessing GPS data for that agent's smart phone.) Using the determined physical location along with the current time of day, and comparing it to a particular time, the system can determine if a scheduled appointment will result in a mismatch of physical presence at a future lockbox to be accessed. In other words, the agent may be too early, or too late, to reach a scheduled appointment location at an appropriate time, and the system can determine these variables based on the time of day and the GPS location where the agent's wireless portable computer is located. If the system determines that the agent is running late (while taking into account travel time) at step 504, then the system can recalculate a new, time-shifted appointment time for that agent to reach that appointment location, and then will send a new set of time limited access credentials to the agent that match the new scheduled appointment time (at one of steps 612 or 632, for example). The original set of time limited access credentials originally sent would now be obsolete and unusable, since the original credentials would not match the new appointment time.

On the other hand, if the agent is running early, the system designer can decide what time tolerances are to be used in the system (or allow the Real Estate Board to set those tolerances as variables). These time tolerances are mainly used to determine if the agent will likely arrive at the property more than "N" minutes too early, or more than "M" minutes too late, as compared to the originally-scheduled starting time of his/her appointment at that property. For example, the value of "N" could be set to a time tolerance as little as 5 minutes, and the value of "M" could be set to a greater time tolerance, such as 30 minutes. (Again, the Real Estate Board should perhaps be allowed to set these time tolerance variable values.) In this overall system, these time tolerances can be taken into account to determine if new time limited access credentials would need to be sent to the agent. (See below for more detail.)

In another variation, a person who is attending a showing may quickly decide, soon after arrival at the property site of the showing, that they want to cut their visit short. In that situation, the showing agent—or perhaps the prospective buyer—may then decide that they wish to move up the remaining appointment(s) that have been scheduled for later that same day. This would, of course, be the opposite of the situation described in the preceding paragraph, but it occurs often enough that real estate agents are subjected to such situations on a regular basis. When that occurs, the agent may request that his or her future appointments that have already been scheduled be time-shifted to an earlier time interval, and ask the central computer to perform its Reschedule Routine (see below) to accomplish that task. (Those future showing times have suddenly become "undesirable" to the showing agent's schedule.) Such rescheduling may even alter the order of appointments; for example, if the agent has his or her "appointment #1" suddenly cut short, but cannot move his/her "appointment #2" to an earlier time, then perhaps his/her "appointment #3" could be moved to an earlier time that still allowed sufficient time for that agent to successfully attend both "appointment #3" (now rescheduled) and "appointment #2, in that new chronological order.

Figure 11:
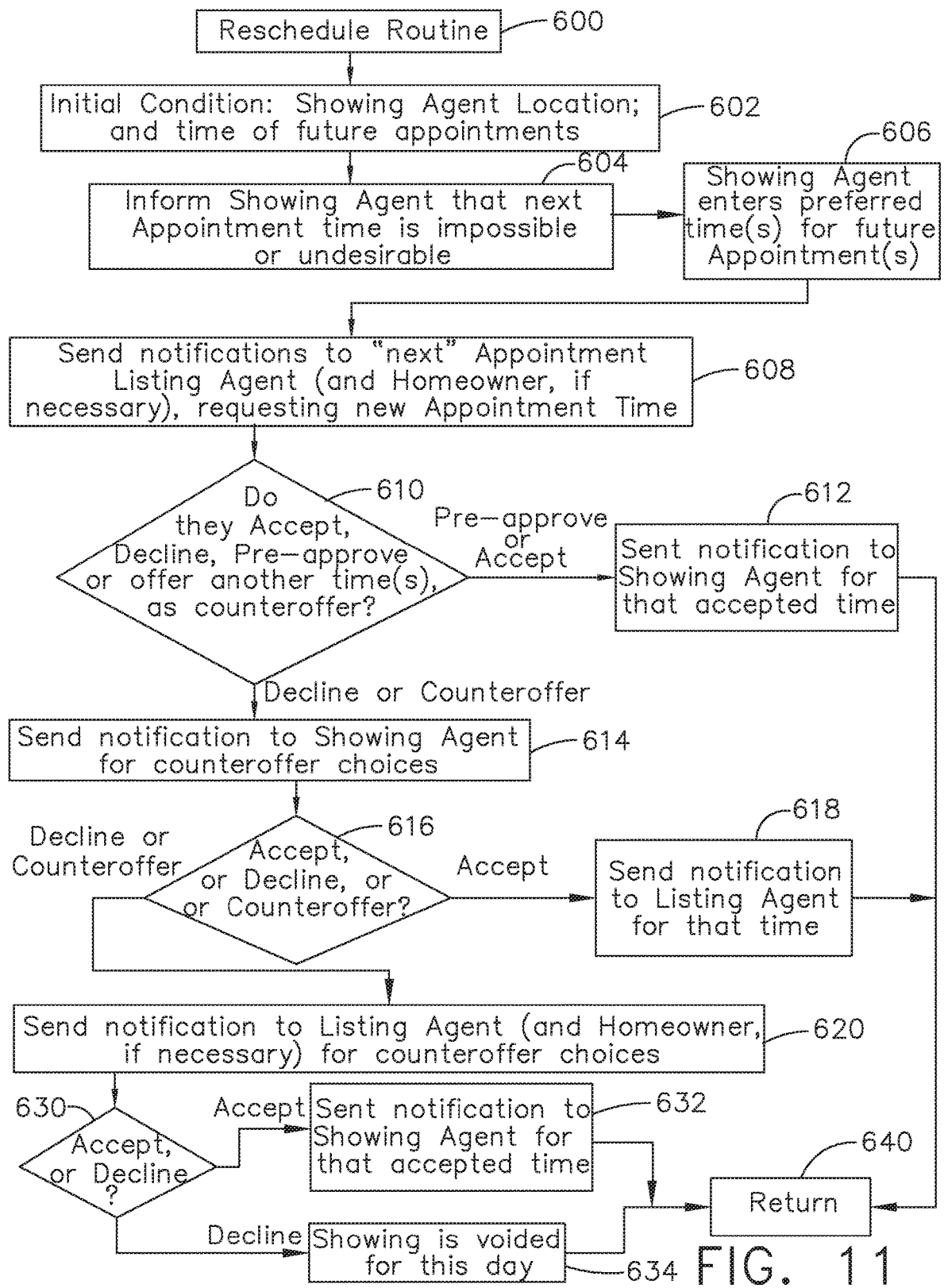
FIG. 11 is a flow chart of certain steps performed during a "Reschedule Routine," as used in the system depicted in FIG. 10.

Referring now to FIG. 11, a flow chart illustrates the Reschedule Routine starting at a step 600. A next step 602 requires an initial condition to be available, which is a known showing agent, and that showing agent's scheduled time of future appointments. Next, at a step 604, the system informs the showing agent that the next appointment time is impossible to make (or is undesirable, as in the previous paragraph), based on the LTT Routine (as depicted in FIG. 10). At a step 606, the showing agent can enter a preferred time, or a choice of times, for rescheduling the future appointment, or appointments. Then, at a step 608, the system sends notifications to the "next" appointment listing agent (and homeowner, if necessary), and requests a new appointment time (or a choice of potential times) from them. As noted above, the newly requested appointment time could either be later or earlier in real time, depending on the exact circumstances for that showing agent.

At a decision step 610, the listing agent and/or the homeowner may accept, decline, or offer another time (a "time" counteroffer). If the showing agent's originally proffered time is accepted by the listing agent and/or the homeowner, then the logic flow is directed to a step 612, in which the system sends a notification to the showing agent for that proffered time. However, if the listing agent and/or the homeowner declines or time counteroffers, then the logic flow is directed to a step 614, in which the system sends a notification to the showing agent of the time counteroffer choices, if any. (If "Decline" is the result, then the showing of that property by this showing agent is voided for this day.)

Another option at step 610 could be to allow a range of times to be "pre-approved" by the homeowner, for example. In other words, if a combination of the listing agent and the homeowner knows in advance that certain time periods will be acceptable for showings, then if the newly requested appointment time (either earlier or later in real time) falls within that acceptable range of time periods, then such requests can be programmed to be automatically approved—this could be called a "pre-approval" function, as part of step 610. The result would be the same as the "Accept" result, and the logic flow would be directed to the step 612. An example of a pre-approval situation could be for a homeowner who works a day shift, and will not be home until after 6:00 PM, and a requested time for rescheduling an appointment for a showing is made for the time interval from 3:00 PM to 5:00 PM. In that situation, the pre-approval would grant the request for rescheduling.

Assuming the listing agent and/or homeowner offer a new showing time (a timing counteroffer) at step 614, then at a decision step 616, the showing agent may accept, decline, or time counteroffer the listing agent's and/or the homeowner's time counteroffer from decision step 610. If the showing agent accepts, then the logic flow is directed to a step 618 where the system sends a notification to the listing agent for that accepted new time. However, if the showing agent instead counteroffers or declines, then the logic flow is directed to a step 620, in which the system sends a notification to the listing agent of the counteroffer choices, if any. (Again, a "decline" will void any showing of that property by this showing agent for that date.)

Once the LTT Routine has run, and the Reschedule Routine has run (if necessary), the logic flow is directed back to FIG. 9 at a step 406, in which the showing agent visits the first LB. Assuming the visiting agent is authorized to obtain access to the lockbox, he or she may produce the authorizing credentials to the lockbox in two different ways. If the agent is using an electronic key (such as a smart phone), then a computer file that is encrypted (diversified) with a user-entered code on the keypad of the electronic key is sent wirelessly to the lockbox from the smart phone. That computer file is then decrypted by the lockbox, and if the user was indeed authorized to access that particular lockbox at this moment in real time, then the lockbox will allow the agent to obtain access to its secure compartment.

On the other hand, if the visiting agent does not have a smart phone with the appropriate software to wirelessly send the necessary encrypted computer file to the lockbox, then that agent may produce a time limited access code by entering that code on the keypad 314 of the lockbox. This code would have to be set up in advance by the listing agent for that specific lockbox. However, so long as that visiting agent arrives within the appropriate time window for using that time limited access code, then the lockbox will allow that visiting agent to obtain access to its secure compartment, once that code has been verified by the processing circuit 316 of that lockbox 310. This feature could be especially useful for allowing visitors who are not 'normal' real estate agents to obtain access to the property—again under the control of the listing agent, who must set up such access codes.

During this showing at LB #1, the central computer system periodically calls the LTT Routine at a step 420 to determine if the showing agent is on time or is now running late for future appointments. Once that LTT Routine finishes, and the visiting agent has finished with the showing, then at a step 408 the system logs the appointment has ended at the first lockbox LB #1.

Yet again, the CCC system calls the LTT Routine at a step 420 to determine if the showing agent is on time or is now running late for future appointments. Once the LTT Routine finishes, at a decision step 410, the system checks if any future appointments have been rescheduled. If the CCC system determines that any future appointments have been rescheduled, then the logic flow is directed to a step 412 in which the showing agent travels to the next rescheduled appointment. However, if the system determines that no rescheduling has occurred, then the logic flow is directed to a step 414 in which the showing agent travels to the next appointment as originally planned. In either case, at a step 416 the showing agent visits the second LB, and then at a step 418 the CCC system repeats all the steps from 408 (showing ended) through 416 (visit next LB), as the agent continues on his or her appointment schedule.

After step 620 on FIG. 11, the listing agent and/or homeowner will review the time counteroffer choices sent by the showing agent at a decision step 630. If the latest time counteroffer is accepted by the listing agent and/or homeowner, then the CCC system will send a notification to the showing agent for that accepted new appointment time at a step 632. Or, if the latest time counteroffer is declined by the listing agent and/or homeowner, then the CCC system will void the showing of that property by this showing agent for this day. (Of course, the showing agent and listing agent can get together at any time to arrange for a "new" showing of that property on a later date.) The CCC system will send the appropriate notifications to the involved persons to cancel this showing at a step 634.

At the end of steps 612, 618, 632, and 634 on FIG. 11, the logic flow is directed to a RETURN step 640. At this point, the logic flow is directed back to the point on FIG. 10 where the function call originated—i.e., just before one of the steps 406, 408, or 410, for example.

It will be understood that the "main" control system (the CCC) can be programmed to have a fairly small time tolerance when making the time calculations for determining whether a showing agent will, or will not, be "late" for a future ("next") appointment. For example, if the showing agent is running five (5) minutes late at the end of appointment No. 1, then should the CCC system declare that the Reschedule Routine of FIG. 11 be invoked? Perhaps YES, perhaps NO. The computer system can let the local Real Estate Board make that decision for everyone in that Board Region, or the listing agent can be allowed to make that decision for his or her lockboxed properties for sale. The system designer can make this a "global" entry for the entire Real Estate Board Region, if desired, or for individual property owners, or for individual lockbox owners, as desired.

The CCC (central computer) system can be programmed to determine how often to "check" an agent's GPS location for potential rescheduling (at step 504 on FIG. 10). For example, the system could check the physical location of the agent's wireless portable computer (e.g., a smart phone) as infrequently as once per scheduled appointment. Or, more likely, the system could instead repetitively check that physical location by using a predetermined time interval (such as, e.g., every 15 minutes or every 30 minutes) as the basis for when to perform those repetitive checks. This "check physical location" routine helps in determining the time tolerances needed for the system to also determine whether there will likely be an early or late arrival to a scheduled appointment, as discussed above.

It will also be understood that the time for scheduling an appointment will automatically include some type of "duration" parameter, involving the expected time required for the agent to perform a "showing" of a property to a prospective customer. That time duration parameter could be an automatic feature of the central computer's scheduling software functions, or it could be a manually-set number (in time) that must be entered by a showing agent as he or she originally requests the appointment time. It could also be determined by a listing agent, if the central computer allows for this, and one important factor could be the size of the building, or the value of the property, or the "type" of property (e.g., whether it is an empty lot or has a finished building), and perhaps other factors. Furthermore, the "duration" parameter could have both minimum and maximum time values, again, as determined by the central computer (essentially based on a decision by the Real Estate Board) or by the listing agent, for example. And of course, the showing agent may request more duration time or less duration time, as well.

With all the above in mind, even though the starting time is the parameter that typically is thought of when making an appointment, in reality, the scheduled appointment encompasses an "interval" of time, thereby including the expected "duration" of the showing. This should be an automatic feature of a computer system that provides schedule controlled access credentials for opening electronic lockboxes. Therefore, when determining whether or not an appointment request should be granted, the central computer should take the duration into account, and thus include an "appointment time interval" for every scheduled showing appointment request. Moreover, such an appointment time interval can also take into account the time tolerances discussed above, with respect to "how early" or "how late" a visiting person (typically the showing agent) should be allowed to arrive, and still be permitted to gain access to the contents of the lockbox.

It will be further understood that a somewhat less sophisticated system could optionally be utilized by using a geofence at some or all of the lockboxes that are installed in a particular Real Estate Board Region, if desired. If, for example, a particular showing agent does not have a GPS receiver in his or her smart phone, then his or her geographic location could still be inferred during, and just after the completion of, a showing at one of the properties that is protected by a system lockbox. The short-range wireless communications "network" between the lockbox and the wireless portable computer (acting as an "electronic key") can establish a geofence. (Note: a "geofence" is a virtual perimeter that establishes a geographic boundary (a 'virtual' boundary) that represents a real-world geographic area; in many physical applications, the geofence is electronically-established, typically using GPS coordinates, or perhaps using a short-range radio transmitter and receiver system that create a radius of relatively limited range from a central point (throughout that radius), based upon the power level of the radio transmitter.)

The two wireless transmitters and receivers involved in the lockbox visitation transaction can periodically send short data messages to each other, and expected maximum time intervals. Once the geofence is "penetrated" by the WPC, which means that it has exceeded the maximum wireless range for that short-range wireless communications network, there will be no further receptions by either one of those two wireless receivers. If that status exists for more than a given amount of time (five minutes, for example), then the WPC can assume that the showing has been completed, and that the visiting agent has left that property site. That information can be automatically sent to the central computer for its use in calculating an updated arrival time at the "next appointment" for that WPC and the human visiting agent who is carrying that WPC.

Furthermore, the fact that the two short-range transmitters and receivers are both "satisfied" that the geofence has not yet been penetrated allows the WPC to periodically send updated wireless messages to the central computer, which more definitely fixes the approximate geographic location of that WPC and its human user. In other words, so long as the geofence has not yet been penetrated, then the central computer can be fairly certain that the visiting agent has not yet left that property site, and can update its scheduling calculations accordingly. This type of short-range periodic communication for the purpose of "locating" a sales agent within a virtual geofence, or the "end" of that encounter within a specific geofence established by a lockbox, is more fully described in U.S. Pat. No. 8,593,252 (now RE46,539), titled, ELECTRONIC LOCK BOX PROXIMITY ACCESS CONTROL owned by the common assignee, SentriLock, LLC, and is incorporated by reference herein, in its entirety. Obviously, this less sophisticated system provides limited information compared to a system that is able to use GPS information for establishing the geographic location of the WPC and its human user.

Scheduling Routine

Figure 12:
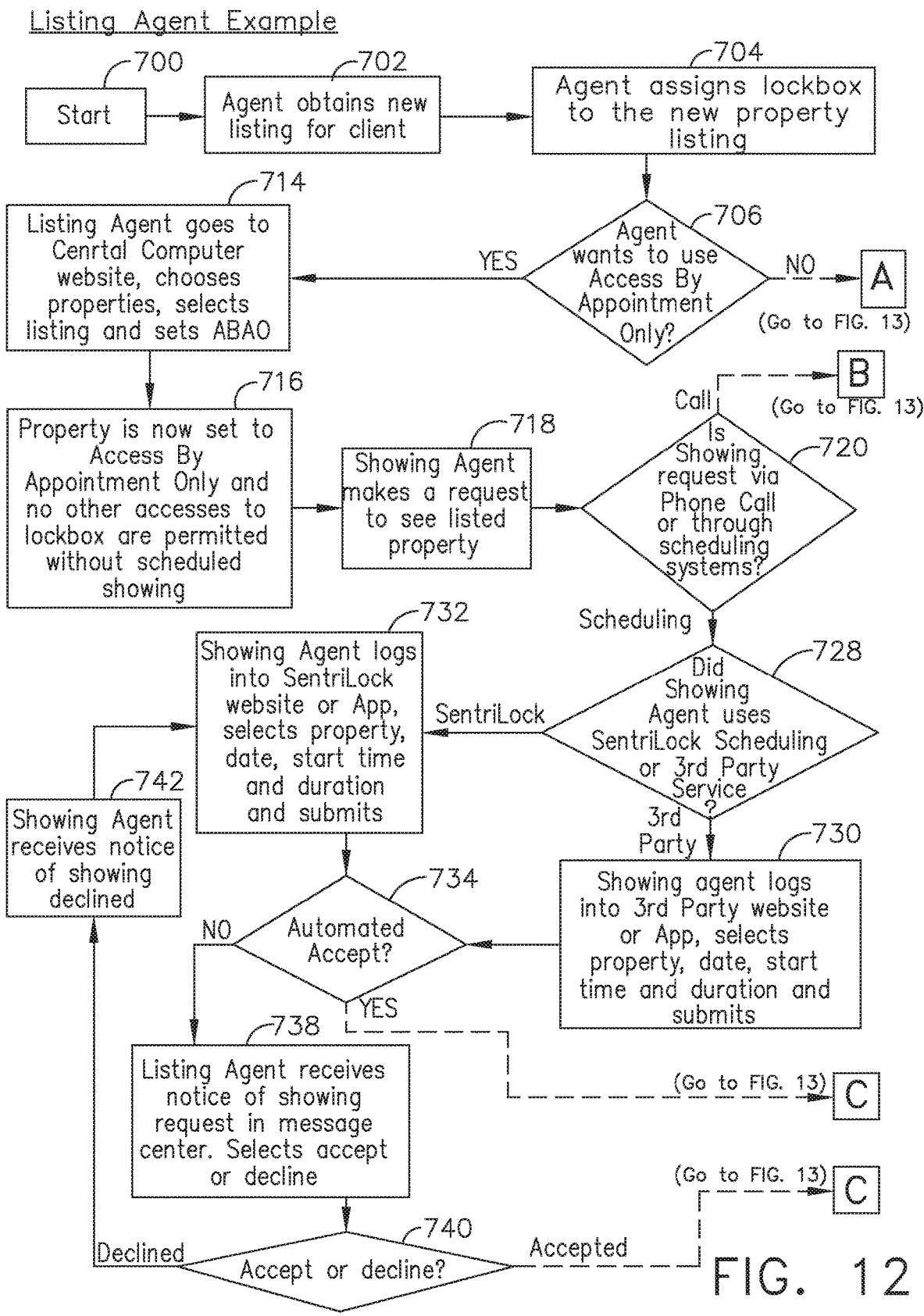
FIG. 12 is a flow chart of certain steps performed during a "scheduling routine," as used in the system depicted in FIG. 3.
Figure 13:
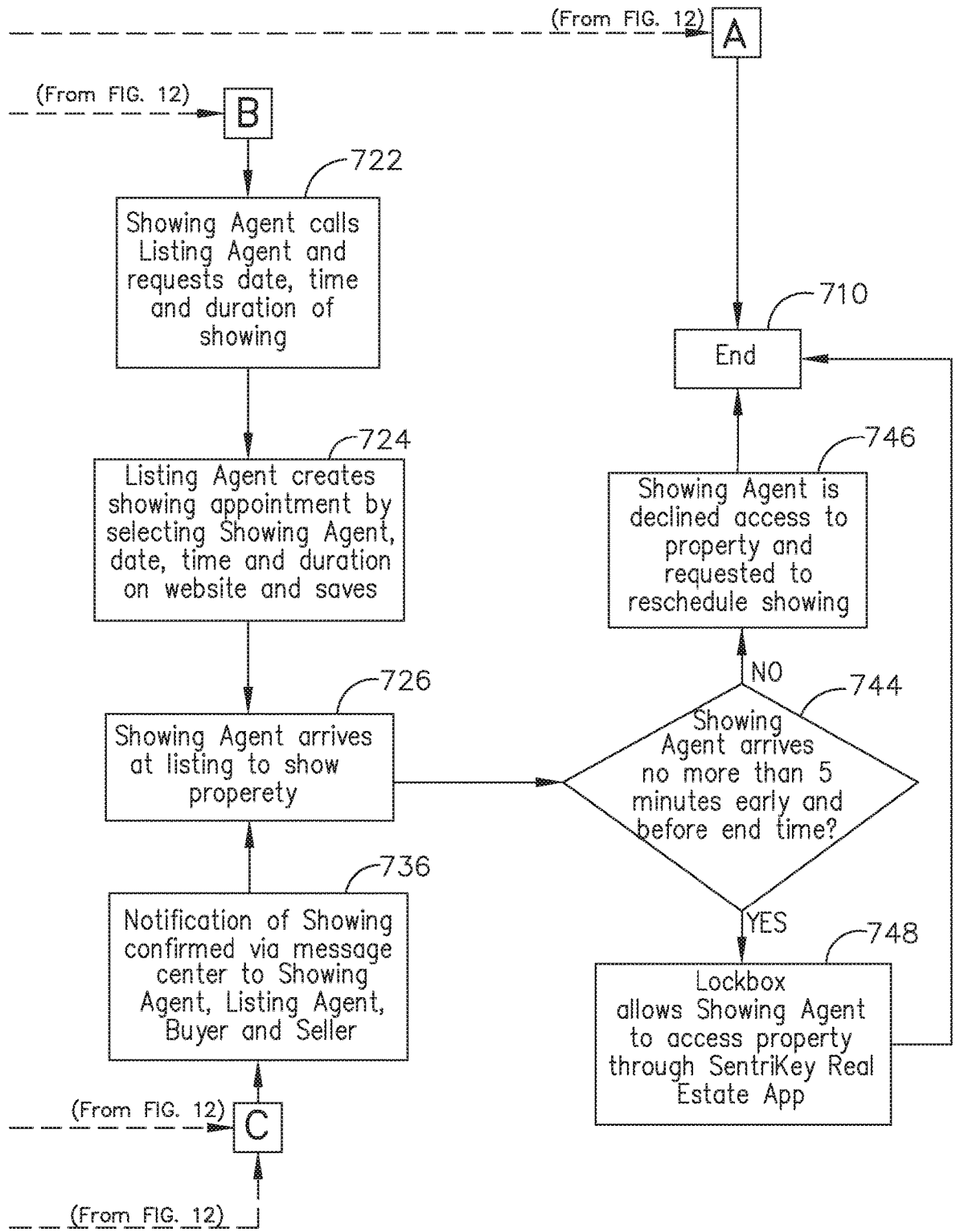
FIG. 13 is a flow chart of further certain steps performed during a "scheduling routine," as used in the system depicted in FIG. 3.

FIGS. 12 and 13 depict flow charts detailing certain steps a listing agent would perform during a scheduling routine. These steps and the following description provide an example of how the listing and showing agents interact with the user interface of the system described above in FIGS. 9-11. In this example illustrated in FIGS. 12-13, the central computer will sometimes be referred to as the "SentriLock website" or the "SentriLock Scheduling" feature, and further, the software used by the real estate sales agents will sometimes be referred to as the "SentriKey app". SentriLock, LLC is the name of the company that is the assignee of this patent document, and it also owns a website named "www.sentrilock.com", which is the website home page for the central computer that is provided to users of the SentriLock, LLC system lockboxes. The "SentriKey app" is an executable software program that can be installed on an agent's smart phone (or other type of wireless portable computer), and this app is also owned by SentriLock, LLC, and provided to those same users. Of course, other providers of electronic lockboxes, or apps to be used with such lockboxes will be known under different brand names or company names.

Referring now to FIG. 12, the scheduling routine begins at a step 700. At a step 702, the listing agent obtains a new listing from a client and, at a step 704, the listing agent assigns a lockbox to that new property. Then, at a decision step 706, the listing agent must choose if he or she wants to use "Access by Appointment Only." If the listing agent chooses "no," then at a step 710, the scheduling routine ends, at a step 710.

However, if the listing agent chooses "yes," then at a step 714, the listing agent uses a computer or smart device (such as a smart phone or a tablet) and navigates to the central computer system, such as the sentrilock.com website. Using the central computer, the listing agent may choose properties, select one or more listings and then set "Access by Appointment Only." Note that the sentrilock.com website may be opened in a typical web browser (such as Google Chrome, Microsoft Edge, or Apple Safari), or the site may be opened through the SentriLock, LLC smart device app, including an app that is known as the "SentriKey Real Estate app".

Next, at a step 716, the property has now been set to Access by Appointment Only, and no other accesses to the lockbox are permitted without a scheduled showing. At a step 718, a showing agent makes a request to see the listing agent's property listing. A decision step 720 determines if the showing agent made the request via a phone call, or through the scheduling system. If the showing agent selects phone call, then at a step 722, the showing agent calls and requests a date, time, and duration for a showing from the listing agent (see FIG. 13). Next, at a step 724, the listing agent goes to the sentrilock.com website and creates the showing appointment by selecting "Showing Agent," date, time and duration, and then saves the showing (see FIG. 13). Then, at a step 726, the showing agent arrives at the listing to show the property to a prospective Buyer (see FIG. 13).

Referring back to decision step 720, if the showing agent did not make the request through a phone call, but instead made the request through the online scheduling system, then a decision step 728 determines if the showing agent used the SentriLock Scheduling feature, or a third party service to schedule the showing. If the showing agent used the SentriLock Scheduling feature, then at a step 732 the showing agent logs into the sentrilock.com website (or smart device app), and selects property, date, the start time and duration, and then submits. If the showing agent used a third party service, then at a step 730 the showing agent logs into a third party website and selects the property, date, start time and duration and submits.

Both step 730 and step 732 flow into a decision step 734, which checks if there was an automated acceptance to the showing agent's scheduling request. If the answer is "yes" to the automated acceptance, then at a step 736 the notification of showing is confirmed via the message center to the showing agent, listing agent, Buyer and Seller at a step 736 (see FIG. 13).

If the answer is "no" to the automated acceptance decision step 734, then at a step 738 the listing agent receives a notice of showing request in the message center. The listing agent must accept or decline at a decision step 740. If the listing agent declines, then at a step 742 the showing agent receives notice that the showing request was declined. Then the process flows back to step 732, in which the showing agent may make a new showing request through the sentrilock.com website (or the SentriKey Real Estate app. Note that although the flow chart does not show this, the showing agent can alternatively make the request again through a third party app at step 730. If the listing agent accepts, then the logic flow is directed to step 736 (see FIG. 13).

Referring now to FIG. 13, the logic from step 736 and step 724 both flow to a step 726, in which the showing agent arrives at the listing to show the property to a prospective buyer. The scheduling system has a timing requirement, as stated in a decision step 744, in which the system checks if the showing agent has arrived no more than five (5) minutes early and before the showing end time. If the answer is "no," then at a step 746, the showing agent is declined access to the property and requested to reschedule the showing. In other words, the showing agent will not be able to access the lockbox associated with the property listing, because he or she did not request access within the proper time constraints.

However, if the answer is "yes," then at a step 748, the lockbox allows the showing agent to access the property, for example, through the SentriKey Real Estate App. This step allows the showing agent to open the lockbox associated with property listing. After either step 748 or step 746, the process flow is directed to the "end" step 710, in which the procedure for accessing the property using a scheduled showing has ended.

It should be noted that the previously arranged schedule for a showing agent's entire day can be suddenly altered by certain new circumstances, such as having an early appointment cancelled by another party. For example, if the showing agent had scheduled four appointments for a single day, and if the second appointment suddenly goes 'under contract' early in the day (i.e., a contract to sell the property has been made), then that second appointment will be immediately cancelled—or at least, it should be. There is little point to having a showing at a property that has already been sold, and the property owner would likely object to allowing such a showing to take place, even if a third party prospect wanted to actually go through the property. And note: this is a common occurrence that real estate agents are required to put up with on a regular basis.

Therefore, in the event a showing is suddenly cancelled, the central computer can be allowed to attempt to quickly reschedule the later appointments for that showing agent; in the above example, the showing agent's third and fourth appointments for that day could be moved to earlier times, if all the interested parties would agree to such changes in the appointment times. Or, for example, the third appointment could remain at its originally-scheduled time, and the fourth appointment could be moved up to the original time of the second appointment (that was cancelled by other circumstances). These situations are similar to the circumstance in which a client quickly determines that they want to cut short a showing, as discussed in connection with the function step 604, in determining that the "next appointment time" is undesirable.

The principles discussed above and illustrated in the drawings can be further summarized in a series of short statements, such as follows:

{A1} An electronic lockbox control system comprising:
  a plurality of electronic lockboxes, at least one wireless portable computer, a central computer, and a communications network that allows data messages to be sent between the central computer and the at least one wireless portable computer;
  the central computer includes a first processing circuit, a first memory circuit, a first communications circuit, and a database that contains a plurality of appointment schedule events;
  a first of the at least one wireless portable computer includes a second processing circuit, a second memory circuit, a first display, a first user-activated data input circuit, and a second wireless communications circuit, wherein the second wireless communications circuit can exchange data messages with the central computer, and with other wireless computers; and
  each of the plurality of electronic lockboxes including a third processing circuit, a third memory circuit, a third wireless communications circuit, and a secure compartment that is controlled by the third processing circuit; wherein the third wireless communications circuit can exchange data messages with the first wireless portable computer;
  wherein:
  the central computer automatically sends data messages to the first wireless portable computer, in which the data messages include time limited access credentials that are responsive to appointment schedule events pertaining to at least one of the plurality of electronic lockboxes.

{A2} The control system of the above paragraph {A1}, plus the following features: the time limited access credentials allow an authorized visiting agent to obtain access to the secure compartment of a predetermined one of the plurality of electronic lockboxes, if the time limited access credentials are presented to that predetermined one of the plurality of electronic lockboxes within a predetermined time interval.

{A3} The control system of the above paragraph {A1}, plus the following features: the time limited access credentials prevent an authorized visiting agent from obtaining access to the secure compartment of a predetermined one of the plurality of electronic lockboxes, if the time limited access credentials are presented to that predetermined one of the plurality of electronic lockboxes, but not within a predetermined time interval.

{A4} The control system of the above paragraph {A3}, plus the following features:
  (a) the time limited access credentials are altered by the central computer so as to time shift the predetermined time interval to a different real time period; and (b) the altered time limited access credentials allow an authorized visiting agent to obtain access to the secure compartment of the predetermined one of the plurality of electronic lockboxes, if the altered time limited access credentials are presented to that predetermined one of the plurality of electronic lockboxes within a predetermined time interval that is correct with respect to the different real time period.

{A5} The control system of the above paragraph {A4}, plus the following features:
a second of the at least one wireless portable computer, which includes a fourth processing circuit, a fourth memory circuit, a second display, a second user-activated data input circuit, and a fourth wireless communications circuit, wherein the fourth wireless communications circuit can exchange data messages with the central computer, and with other wireless computers; wherein: the person using the second wireless portable computer can either approve or decline the different real time period for access to the secure compartment of that predetermined one of the plurality of electronic lockboxes.

{A6} The control system of the above paragraph {A5}, plus the following features: the first wireless portable computer and the second wireless portable computer are both smart phones.

{B1} An electronic lockbox control system comprising:
a plurality of electronic lockboxes, at least one wireless portable computer, a central computer, and a communications network that allows data messages to be sent between the central computer and the at least one wireless portable computer;
the central computer includes a first processing circuit, a first memory circuit, a first communications circuit, and a database that contains a plurality of appointment schedule events;
a first of the at least one wireless portable computer includes a second processing circuit, a second memory circuit, a first display, a first user-activated data input circuit, a global positioning (GPS) receiver, and a second wireless communications circuit, wherein the second wireless communications circuit can exchange data messages with the central computer, and with other wireless computers; and
each of the plurality of electronic lockboxes including a third processing circuit, a third memory circuit, a third wireless communications circuit, and a secure compartment that is controlled by the third processing circuit; wherein the third wireless communications circuit can exchange data messages with the at least one wireless portable computer;
wherein:
the central computer is in periodic communication with the first wireless portable computer;
the central computer automatically determines the approximate geographic location of the first wireless portable computer, using data from the GPS receiver, and compares the next scheduled location visit time for the person using that first wireless portable computer with the travel time from the current location to the next scheduled location; and
if, due to the necessary travel time, the next scheduled visit cannot occur on time, the central computer sends a data message to at least one other system user, the data message including a revised estimated schedule visit time.

{B2} The control system of the above paragraph {B1}, plus the following features:
a second of the at least one wireless portable computer, which includes a fourth processing circuit, a fourth memory circuit, a second display, a second user-activated data input circuit, and a fourth wireless communications circuit, wherein the fourth wireless communications circuit can exchange data messages with the central computer, and with other wireless computers; wherein: the person using the second wireless portable computer can either approve or decline the revised estimated schedule visit time.

{B3} The control system of the above paragraph {B2}, plus the following features: upon approval of the revised estimated schedule visit time by the person using the second wireless portable computer, the access credentials for the electronic lockbox located at the next appointment are updated on the first wireless portable computer with that revised estimated schedule visit time.

{B4} The control system of the above paragraph {B2}, plus the following features: upon declining the revised estimated schedule visit time by the person using the second wireless portable computer, the access credentials for the electronic lockbox located at the next appointment are removed from the first wireless portable computer, or they are invalidated.

{B5} The control system of the above paragraph {B2}, plus the following features: the first wireless portable computer and the second wireless portable computer are both smart phones.

Some additional information about "earlier" lockbox embodiments, including advanced features, are more fully described in earlier patent documents by the same inventor, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. Pat. No. 7,999,656, issued Aug. 16, 2011, for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. Pat. No. 8,451,088, issued May 28, 2013, for ELECTRONIC LOCK BOX WITH TRANSPONDER BASED COMMUNICATIONS; U.S. Pat. No. 8,164,419, issued Apr. 24, 2012, for ELECTRONIC LOCK BOX WITH TIME-RELATED DATA ENCRYPTION BASED ON USER-SELECTED PIN; U.S. Pat. No. 8,151,608, issued Apr. 10, 2012, for ELECTRONIC LOCK BOX WITH MECHANISM IMMOBILIZER FEATURES; U.S. patent application Ser. No. 12/756,741, filed on Apr. 8, 2010 (Publication No. US 2011/0251876), for ELECTRONIC LOCK BOX SYSTEM WITH INCENTIVIZED FEEDBACK; U.S. Pat. No. 8,593,252, issued Nov. 26, 2013, for ELECTRONIC LOCK BOX PROXIMITY ACCESS CONTROL; U.S. Pat. No. 8,912,884, issued Dec. 16, 2014, for ELECTRONIC KEY LOCKOUT CONTROL IN LOCKBOX SYSTEM; U.S. patent application Ser. No. 13/830, 024, filed on Mar. 14, 2013 (Publication No. US 2014/0266586), for CONTEXTUAL DATA DELIVERY TO MOBILE USERS RESPONSIVE TO ACCESS OF AN ELECTRONIC LOCKBOX; U.S. Pat. No. 9,704,315, issued Jul. 11, 2017, for CONTEXTUAL DATA DELIVERY TO OTHER USERS AT AN ELECTRONIC LOCKBOX; U.S. Pat. No. 9,830,760, issued Nov. 28, 2017, for CONTEXTUAL DATA DELIVERY TO USERS AT A LOCKED PROPERTY; U.S. Patent Application Ser. No. 62/824,494, filed on Mar. 27, 2019, for IMPROVED ELECTRONIC LOCKBOX; and U.S. patent application Ser. No. 16/424,880, filed on May 29, 2019, for ELECTRONIC LOCKBOX WITH INTERFACE TO OTHER ELECTRONIC LOCKS. These patent documents and pending applications are incorporated by reference herein, in their entirety.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

Additionally, it will be understood that a computing product that includes a display to show information to a human user, and that also includes a "user operated input circuit" so the human user is able to enter commands or data, can be provided with a single device that is known as a "touchscreen display." In other words, if a patent claim recites a "display" and a "user operated input circuit" as two separate elements, then a single touchscreen display, in actually, is exactly the same thing. It should be noted that a touchscreen display usually includes a virtual keypad, and therefore, a "user operated input circuit" typically comprises a virtual keypad, particularly on smart phones and on tablet computers. Moreover, in this situation, the word "virtual" means that it is not a hardware keypad; more specifically, "virtual" means that it is formed (i.e., "created") on the display screen because of software being executed by a processing circuit.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal" Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An electronic lockbox control system comprising:
a plurality of electronic lockboxes, at least one wireless portable computer, a central computer, and a communications network that allows data messages to be sent between the central computer and the at least one wireless portable computer;
the central computer includes a first processing circuit, a first memory circuit including instructions executable by the first processing circuit, a first communications circuit, and a database that contains a plurality of appointment schedule events;

a first of the at least one wireless portable computer includes a second processing circuit, a second memory circuit including instructions executable by the second processing circuit, a first display, a first user-activated data input circuit, and a second wireless communications circuit, wherein the second wireless communications circuit can exchange data messages with the central computer, and with other wireless computers;

each of the plurality of electronic lockboxes including a third processing circuit, a third memory circuit including instructions executable by the third processing circuit, a third wireless communications circuit, and a secure compartment that is controlled by the third processing circuit, wherein the third wireless communications circuit can exchange data messages with the first wireless portable computer; and a second of the at least one wireless portable computer, which includes a fourth processing circuit, a fourth memory circuit including instructions executable by the fourth processing circuit, a second display, a second user-activated data input circuit, and a fourth wireless communications circuit, wherein the fourth wireless communications circuit can exchange data messages with the central computer, and with other wireless computers;

wherein:

(a) the central computer sends data messages to the first wireless portable computer, using said communications network, in which the data messages include time limited access credentials that are responsive to appointment schedule events pertaining both to at least one of the plurality of electronic lockboxes and to said first wireless portable computer;

(b) based upon physical location information of said first wireless portable computer at a particular time, if the central computer determines that a particular future appointment schedule event will not successfully occur within a first predetermined appointment time interval, including an evaluation of expected travel time, with regard to a first one of the plurality of electronic lockboxes and said first wireless portable computer; then (c) the central computer reschedules said first predetermined appointment time interval to a second predetermined appointment time interval that is time-shifted with respect to said first predetermined appointment time interval, with regard to said first one of the plurality of electronic lockboxes and said first wireless portable computer;

(d) the central computer sends another one of said data messages to the first wireless portable computer which contains information about the second predetermined appointment time interval;

(e) if the first wireless portable computer is presented to said first one of the plurality of electronic lockboxes at a time that is outside of said second predetermined appointment time interval, within a predetermined time tolerance, then the first wireless portable computer will be denied access to said first one of the plurality of electronic lockboxes;

(f) if the central computer reschedules said first predetermined appointment time interval, the time limited access credentials are automatically altered by the central computer so as to time shift the first predetermined appointment time interval to a different real time period;

(g) the altered time limited access credentials allow an authorized visiting person to obtain access to the secure compartment of said first one of the plurality of electronic lockboxes, if the altered time limited access credentials are presented to said first one of the plurality of electronic lockboxes within said second predetermined appointment time interval, which is correct with respect to the different real time period; and a person using the second wireless portable computer can either approve or decline the different real time period for access to the secure compartment of said first one of the plurality of electronic lockboxes, with regard to said first one of the plurality of electronic lockboxes and said first wireless portable computer.

2. The control system of claim 1, wherein: said predetermined time tolerance is determined by a system administrator of the central computer.

3. The control system of claim 1, further comprising: a keypad that is included with said first one of said plurality of electronic lockboxes, said keypad being in communication with said third processing circuit, and said keypad being accessible by a user for entering a numeric code;

wherein: said time limited access credentials allow said authorized visiting person to obtain access to the secure compartment of said first one of the plurality of electronic lockboxes, if, using said keypad to enter an authorizing code, the time limited access credentials are presented to said first one of the plurality of electronic lockboxes within said second predetermined appointment time interval.

4. The control system of claim 1, wherein: if the central computer receives a request from said first portable wireless computer to move said second predetermined appointment time interval to an earlier time, then the central computer attempts to automatically reschedule said second predetermined appointment time interval, which is time-shifted to said earlier time.

5. The control system of claim 1, wherein: if the central computer receives a request from said first portable wireless computer to move said second predetermined appointment time interval to a later time, then the central computer attempts to automatically reschedule said second predetermined appointment time interval, which is time-shifted to said later time.

6. The control system of claim 5, wherein:

(a) if said authorized visiting person is delayed from leaving said first one of the plurality of electronic lockboxes because a sales prospect desires to remain on site longer than originally scheduled; then (b) said authorized visiting person may send a request to the central computer to automatically extend the allowable time to remain on site at said first one of the plurality of electronic lockboxes.

7. The control system of claim 1, wherein: the person using the second wireless portable computer can alternatively counteroffer a different real time period, which would be a third predetermined appointment time interval, with regard to said first one of the plurality of electronic lockboxes and said first wireless portable computer.

8. The control system of claim 1, wherein: the first wireless portable computer and the second wireless portable computer are both smart phones.

9. The control system of claim 1, wherein:

(a) the communications network includes a long-range cellular wireless system that enables the data messages to travel between said first wireless portable computer and the central computer; and (b) the second wireless communications circuit of said first one of the plurality of electronic lockboxes and the third wireless communications circuit of said first wireless portable computer comprise a short-range wireless system that enables the access credentials to be presented to said first one of the plurality of electronic lockboxes.

10. The control system of claim 1, wherein: said physical location information of said first wireless portable computer is determined by at least one of:
(a) a geofence established by a short-range wireless communications system that includes said second wireless communications circuit of said first one of the plurality of electronic lockboxes and the third wireless communications circuit of said first wireless portable computer, which have a limited wireless range such that:
   (i) if the range is exceeded, then any data messages to fail to be received by the non-transmitting one of said communications circuits, thereby penetrating a virtual boundary of said geofence; and
   (ii) after the first wireless portable computer determines that said virtual boundary of said geofence has been penetrated, a wireless message will be sent by said second wireless communications circuit to said first communications circuit of the central computer, using said communications network, thereby providing approximate physical location information after the end of a showing; and
(b) a GPS receiver that is included in said first wireless portable computer, such that:
   (i) a GPS coordinate of the first wireless portable computer is periodically sent by said second wireless communications circuit to said first communications circuit of the central computer, using said communications network.

11. An electronic lockbox control system comprising:
a plurality of electronic lockboxes, at least one wireless portable computer, a central computer, and a communications network that allows data messages to be sent between the central computer and the at least one wireless portable computer;
the central computer includes a first processing circuit, a first memory circuit including instructions executable by the first processing circuit, a first communications circuit, and a database that contains a plurality of appointment schedule events;
a first of the at least one wireless portable computer includes a second processing circuit, a second memory circuit including instructions executable by the second processing circuit, a first display, a first user-activated data input circuit, and a second wireless communications circuit, wherein the second wireless communications circuit can exchange data messages with the central computer, and with other wireless computers; and
each of the plurality of electronic lockboxes including a third processing circuit, a third memory circuit including instructions executable by the third processing circuit, a third wireless communications circuit, and a secure compartment that is controlled by the third processing circuit, wherein the third wireless communications circuit can exchange data messages with the first wireless portable computer;
wherein:
(a) the central computer sends data messages to the first wireless portable computer, using said communications network, in which the data messages include time limited access credentials that are responsive to appointment schedule events pertaining both to at least one of the plurality of electronic lockboxes and to said first wireless portable computer;
(b) based upon physical location information of said first wireless portable computer at a particular time, if the central computer determines that a particular future appointment schedule event will not successfully occur within a first predetermined appointment time interval, including an evaluation of expected travel time, with regard to a first one of the plurality of electronic lockboxes and said first wireless portable computer; then
(c) the central computer reschedules said first predetermined appointment time interval to a second predetermined appointment time interval that is time-shifted with respect to said first predetermined appointment time interval, with regard to said first one of the plurality of electronic lockboxes and said first wireless portable computer;
(d) the central computer sends another one of said data messages to the first wireless portable computer which contains information about the second predetermined appointment time interval;
(e) if the first wireless portable computer is presented to said first one of the plurality of electronic lockboxes at a time that is outside of said second predetermined appointment time interval, within a predetermined time tolerance, then the first wireless portable computer will be denied access to said first one of the plurality of electronic lockboxes;
(f) said time limited access credentials allow an authorized visiting person to obtain access to the secure compartment of said first one of the plurality of electronic lockboxes, if, using said first wireless portable computer, the time limited access credentials are presented to said first one of the plurality of electronic lockboxes within said second predetermined appointment time interval; and
(g) if a pre-approved time interval is programmed at the central computer for said first one of the plurality of electronic lockboxes; and
(h) if said second predetermined appointment time interval falls within said pre-approved time interval; then
(i) said rescheduling from the first predetermined appointment time interval to the second predetermined appointment time interval will automatically be approved.

12. An electronic lockbox control system comprising:
a plurality of electronic lockboxes, at least one wireless portable computer, a central computer, and a communications network that allows data messages to be sent between the central computer and the at least one wireless portable computer;
the central computer includes a first processing circuit, a first memory circuit including instructions executable by the first processing circuit, a first communications circuit, and a database that contains a plurality of appointment schedule events;
a first of the at least one wireless portable computer includes a second processing circuit, a second memory circuit including instructions executable by the second processing circuit, a first display, a first user-activated data input circuit, and a second wireless communications circuit, wherein the second wireless communications circuit can exchange data messages with the central computer, and with other wireless computers;

each of the plurality of electronic lockboxes including a third processing circuit, a third memory circuit including instructions executable by the third processing circuit, a third wireless communications circuit, and a secure compartment that is controlled by the third processing circuit, wherein the third wireless communications circuit can exchange data messages with the first wireless portable computer; and a second one of the plurality of electronic lockboxes located at a different site than said first one of the plurality of electronic lockboxes;

wherein:

(a) the central computer sends data messages to the first wireless portable computer, using said communications network, in which the data messages include time limited access credentials that are responsive to appointment schedule events pertaining both to at least one of the plurality of electronic lockboxes and to said first wireless portable computer;

(b) based upon physical location information of said first wireless portable computer at a particular time, if the central computer determines that a particular future appointment schedule event will not successfully occur within a first predetermined appointment time interval, including an evaluation of expected travel time, with regard to a first one of the plurality of electronic lockboxes and said first wireless portable computer; then (c) the central computer reschedules said first predetermined appointment time interval to a second predetermined appointment time interval that is time-shifted with respect to said first predetermined appointment time interval, with regard to said first one of the plurality of electronic lockboxes and said first wireless portable computer;

(d) the central computer sends another one of said data messages to the first wireless portable computer which contains information about the second predetermined appointment time interval;

(e) if the first wireless portable computer is presented to said first one of the plurality of electronic lockboxes at a time that is outside of said second predetermined appointment time interval, within a predetermined time tolerance, then the first wireless portable computer will be denied access to said first one of the plurality of electronic lockboxes;

(f) said first one of the plurality of electronic lockboxes is associated with said first predetermined appointment time interval;

(g) said second one of the plurality of electronic lockboxes is associated with a third predetermined appointment time interval that is still in the future; and (h) if an authorized visiting person is delayed from leaving said first one of the plurality of electronic lockboxes because a sales prospect desires to remain on site longer than first predetermined appointment time interval; then (i) said authorized visiting person may send a request to the central computer to reschedule said third predetermined appointment time interval to a fourth predetermined appointment time interval that is time-shifted with respect to said third predetermined appointment time interval, with regard to said second one of the plurality of electronic lockboxes and said first wireless portable computer.

13. An electronic lockbox control system comprising:

a plurality of electronic lockboxes, at least one wireless portable computer, a central computer, and a communications network that allows data messages to be sent between the central computer and the at least one wireless portable computer;

the central computer includes a first processing circuit, a first memory circuit including instructions executable by the first processing circuit, a first communications circuit, and a database that contains a plurality of appointment schedule events;

a first of the at least one wireless portable computer includes a second processing circuit, a second memory circuit including instructions executable by the second processing circuit, a first display, a first user-activated data input circuit, a global positioning system (GPS) receiver, a second wireless communications circuit, and a fourth wireless communications circuit, wherein the second wireless communications circuit can exchange data messages with the central computer, and with other wireless computers;

each of the plurality of electronic lockboxes including a third processing circuit, a third memory circuit including instructions executable by the third processing circuit, a third wireless communications circuit, and a secure compartment that is controlled by the third processing circuit, wherein the third wireless communications circuit can exchange data messages with the fourth wireless communications circuit of said at least one wireless portable computer; and a second of the at least one wireless portable computer, which includes a fourth processing circuit, a fourth memory circuit including instructions executable by the fourth processing circuit, a second display, a second user-activated data input circuit, and a fourth wireless communications circuit, wherein the fourth wireless communications circuit can exchange data messages with the central computer, and with other wireless computers;

wherein:

the central computer is in periodic communication with the first wireless portable computer;

the central computer automatically determines an approximate geographic location of the first wireless portable computer, using data from the GPS receiver, and compares the next scheduled location visit time for a person using said first wireless portable computer with the travel time from the current location to the next scheduled location;

if the next scheduled visit cannot occur on time, including an evaluation of expected travel time, the central computer sends a data message to at least said person using the first wireless portable computer, the data message including a revised estimated schedule visit time; and a person using the second wireless portable computer can either approve or decline the revised estimated schedule visit time.

14. The control system of claim 13, wherein: the evaluation of expected travel time includes a calculation that includes traffic conditions of a proposed travel route between said current location and said next scheduled location.

15. The control system of claim 13, wherein: the person using the second wireless portable computer can alternatively counteroffer a new real time period.

16. The control system of claim 13, wherein: upon approval of the revised estimated schedule visit time by the person using the second wireless portable computer, the access credentials for the electronic lockbox located at the next appointment are updated on the first wireless portable computer with that revised estimated schedule visit time.

17. The control system of claim 16, wherein: the updated access credentials are updated on the first wireless portable computer by a rescheduling data message sent by the central computer.

18. The control system of claim 16, wherein: upon declining the revised estimated schedule visit time by the person using the second wireless portable computer, the access credentials for the electronic lockbox located at the next appointment are removed from the first wireless portable computer, or they are invalidated, by an automatic data message sent by the central computer.

19. The control system of claim 13, wherein: the first wireless portable computer and the second wireless portable computer are both smart phones.

20. The control system of claim 19, wherein:
(a) the communications network includes a long-range cellular wireless system that enables the data messages to travel between said first wireless portable computer and the central computer; and
(b) the second wireless communications circuit of said first one of the plurality of electronic lockboxes and the third wireless communications circuit of said first wireless portable computer comprise a short-range wireless system that enables the access credentials to be presented to said first one of the plurality of electronic lockboxes.

21. The control system of claim 13, wherein: said revised estimated schedule visit time is updated by periodically determining a revised approximate geographic location of the first wireless portable computer, using data from the GPS receiver, as a person using said first wireless portable computer is travelling to the next scheduled location.

* * * * *